United States Patent [19]
Ader

[11] Patent Number: 5,743,670
[45] Date of Patent: Apr. 28, 1998

[54] STRUCTURAL FASTENER

[76] Inventor: Thompson G. Ader, 974 Kings Way, W., Hummelstown, Pa. 17036

[21] Appl. No.: 538,084

[22] Filed: Oct. 2, 1995

[51] Int. Cl.$^6$ .................................................. F16B 7/18
[52] U.S. Cl. .................. 403/296; 403/11; 403/170; 403/217; 403/403; 74/89.13; 74/89.14
[58] Field of Search .................. 403/296, 303, 403/304, 306, 170, 171, 174, 217, 403, 208, 407.1, 11; 74/417, 89.13, 428, 89.14

[56] References Cited

U.S. PATENT DOCUMENTS

| | | |
|---|---|---|
| 849,201 | 4/1907 | Calmar ............................. 74/417 X |
| 1,101,805 | 6/1914 | Lewis . |
| 1,405,723 | 2/1922 | Simmons ............................ 81/57.29 |
| 1,482,508 | 2/1924 | Colihan ............................. 81/57.29 |
| 1,567,294 | 12/1925 | Pihl .................................... 403/33 |
| 2,059,175 | 10/1936 | Myracle . |
| 2,495,691 | 1/1950 | Brennan .............................. 74/417 |
| 4,120,596 | 10/1978 | Kunkle . |
| 4,311,435 | 1/1982 | Bergero . |
| 4,406,561 | 9/1983 | Ewing . |
| 4,500,224 | 2/1985 | Ewing . |
| 4,582,347 | 4/1986 | Wilcox et al. . |
| 4,642,837 | 2/1987 | Nichols et al. . |
| 4,973,185 | 11/1990 | Thaller .............................. 403/11 |
| 5,190,392 | 3/1993 | Parma et al. ...................... 403/171 |
| 5,295,756 | 3/1994 | Ohta ................................. 403/407.1 |
| 5,308,184 | 5/1994 | Bernard . |
| 5,310,273 | 5/1994 | Hara .............................. 403/170 X |
| 5,385,420 | 1/1995 | Newman, Sr. et al. . |

FOREIGN PATENT DOCUMENTS

| | | | |
|---|---|---|---|
| 2547007 | 12/1984 | France ................................ 74/417 |
| 594567 | 7/1959 | Italy ................................... 403/256 |
| 46352 | 8/1962 | Poland ................................ 74/417 |
| 441871 | 1/1988 | Switzerland ........................ 403/174 |

Primary Examiner—Harry C. Kim
Attorney, Agent, or Firm—Earl F. Clifford

[57] ABSTRACT

The Structural Fastener is an internal longitudinal, reversible, gear-driven interlocking screw assembly and coupling device. The Structural Fastener uses a spring-loaded, gear driven coupler shaft with a threaded stud that mates with a female threaded socket so as to form an invisible joint that is easily decoupled. The Structural Fastener can be arranged in polar or linear arrays to increase its load-bearing capabilities, its air or water tight sealing capabilities or for redundancy. The Structural Fastener makes a rigid, reliable coupling between coupled members and forms a smooth external splice that is virtually invisible. The Structural Fastener is reversible, reusable, scaleable, precisely torqueable, and can be used with O-rings or sealing gaskets to provide air or water-tight seals. The Structural Fastener provides rapid assembly or non-destructive disassembly using simple hand tools or power-driven tools thus reducing the labor required to assemble the framing for adding a Florida-style room or a greenhouse; or erecting a garage, a pool enclosure or utility building; or similar endeavors. The Structural Fastener can be scaled to meet various load-bearing requirements thus enabling manufacturers to produce shorter load-bearing members that can be assembled in a quick and efficient manner with simple tools and thus reduce shipping and labor costs.

18 Claims, 9 Drawing Sheets

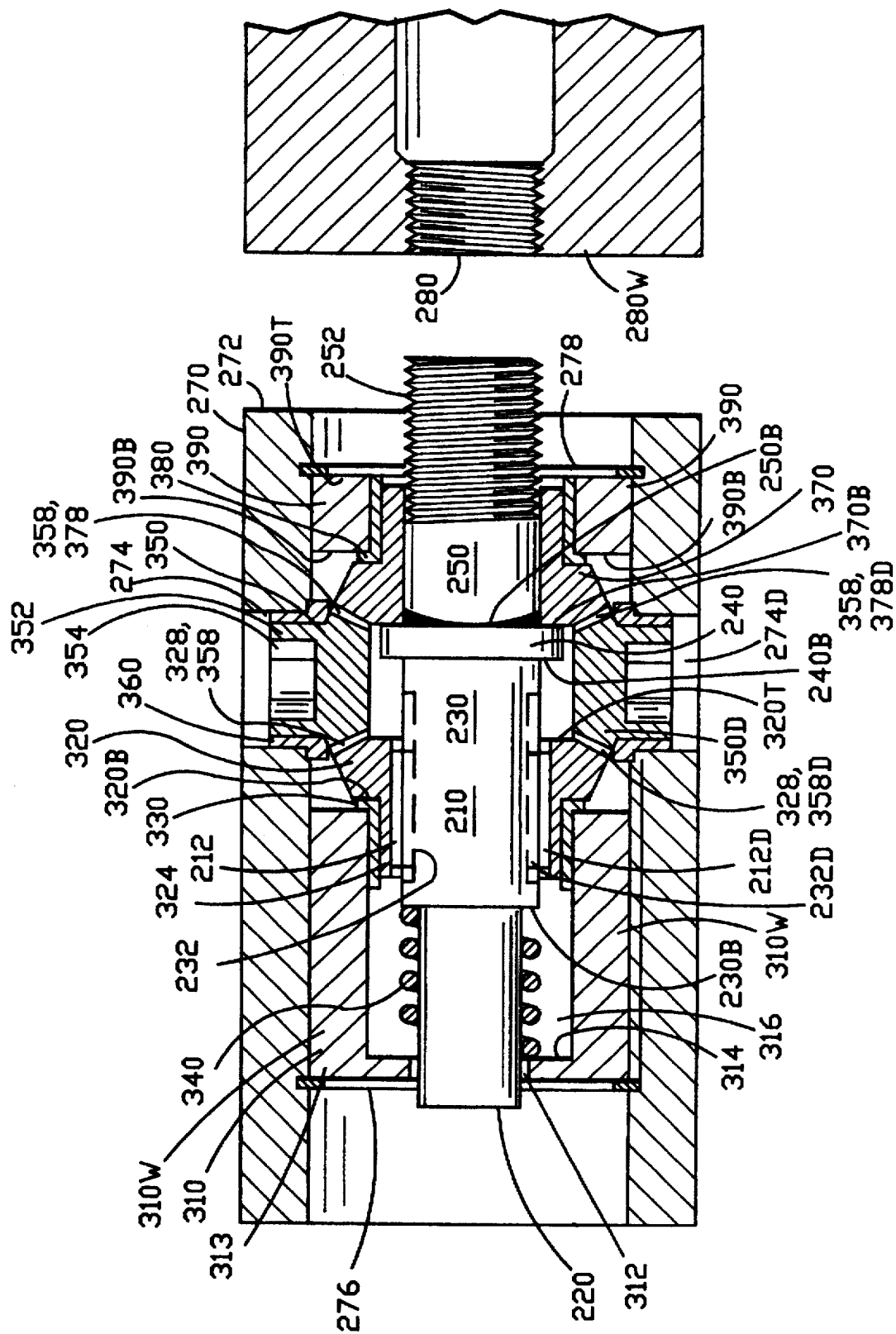

FIG. 6
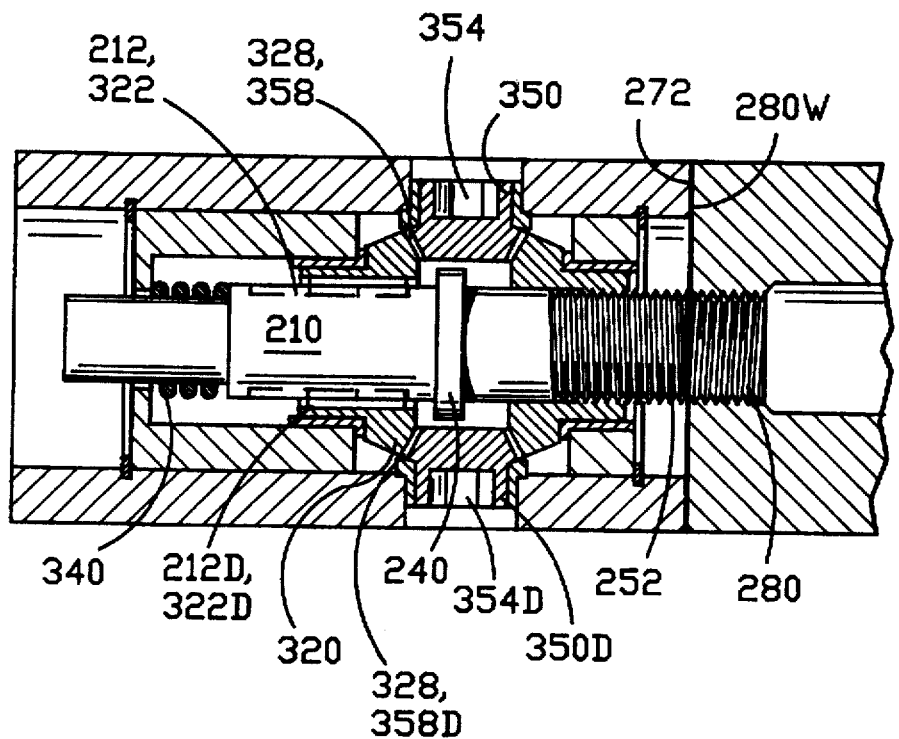
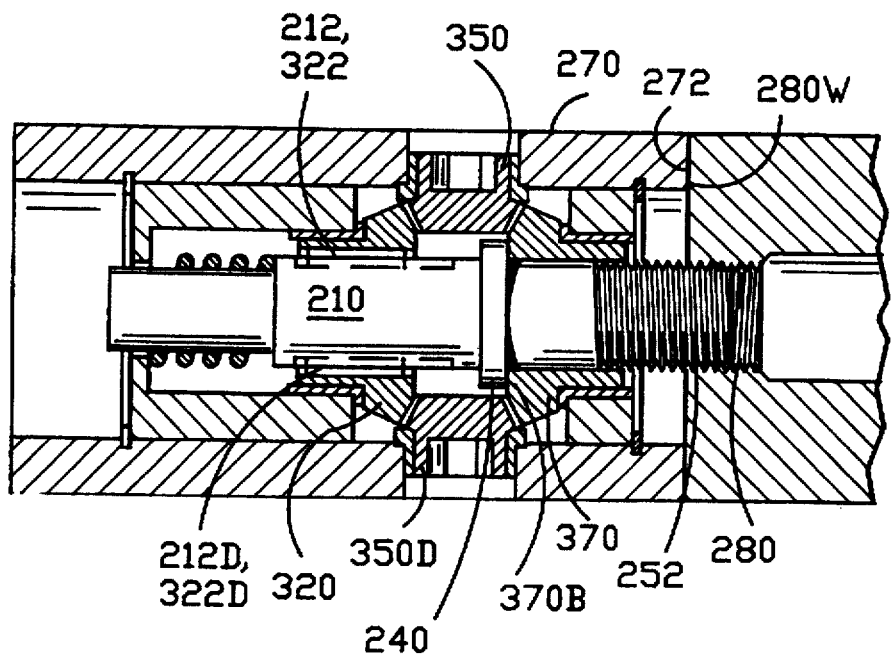
FIG. 7

STRUCTURAL FASTENER

BACKGROUND OF THE INVENTION

1. Field of the Invention

The present invention relates to structural fasteners that quickly and seamlessly join or non-destructively disconnect (uncouple) structural framing members, beams, panels, prefabricated structures and ready-to-assemble components such as equipment, tools, furniture, scaffolding and fencing.

2. Description of the Prior Art

Fasteners are selected in accordance with their capability to perform a particular task, especially in terms of strength, ease of installation (or in some instances, the ease of unfastening), and their appearance in the finished job. Mechanical fastening means such as nails, screws, bolts, staples, anchors, toggle bolts, molly bolts, strap toggles, eye bolts, U-bolts, hook bolts, thumb screws, turnbuckles, joist hangers, framing clips, beam clips, truss clips, bridge clips, mending plates, corrugated fasteners, and rivets are typical of the diverse fasteners devised to perform a multitude of fastening and connecting tasks. These fastening means are typically quite visible after installation thus requiring the utilization of additional resources to hide them from sight. In addition, although many fastening tasks require joining objects along their longitudinal axis, many of the above mentioned fasteners operate in a plane perpendicular to, or oblique to, this longitudinal axis; thus requiring the additional of straps, plates or the like to perform the fastening task.

In contrast to fasteners that operate in a plane perpendicular to a load, the Structural Fastener of the present invention distributes the load longitudinally along the entire surface of an inclined plane formed by an internal coupler shaft whose one end is threaded into a mating female socket. Thus the load is distributed and carried longitudinally in the Structural Fastener of the present invention.

The prior art which may be relevant to this invention is described hereinafter.

U.S. Pat. No. 1,101,805 to Lewis discloses a reinforcing drill tool joint comprising a drill rod portion that has wrench faces and a conical threaded pin at one end that threads into mating internal threads on a drill rod box. After threading the drill rod and the drill rod box together, semi-circular segments (17) are placed around interrupted segments (15 & 16) and then a sleeve (18) is slid up and over these segments and threaded onto the box (8) thus securing and locking the joint. This disclosure uses a rod with a threaded male end to securely couple to a mating internally threaded socket in a second rod.

U.S. Pat. No. 2,059,175 to Myracle discloses a coupling device that provides a releasable connection between a string of pump rods and the moveable member of a well pump. This device comprises a lower coupling with an internal right-handed threaded socket at its lower end for connecting to a pump and a left-handed threaded stud with a hole through it at its other end. This stud is threaded into a mating female socket in the upper coupling and is locked in place by a shear pin inserted into holes in the upper coupling and the hole in the lower coupling's stud. The upper coupling connects to a pump rod via a right-handed threaded stud. This disclosure shows a mechanism for threading two shafts together via a stud and socket arrangement.

U.S. Pat. No. 4,120,596 to Kunkle discloses a valve actuator coupling that applies a limited force to a valve stem with a valve actuator to ensure proper backseating without damaging the valve. The coupling comprises a fitting (16) mounted on a rod (20). This fitting has an internal cavity (34) and internal threads (42). The stem of a valve connects to a 2nd fitting (22) that fits into the cavity (34) and is held in this cavity by a threaded collar (44). A spring (49) mounted between a collar (44) and the fitting (22) applies sufficient force to maintain the surface (38) of the valve stem and the surface (48) of the valve actuator together with a minimal degree of outside force acting on the stem (26) and rod (20). This disclosure uses a spring to force a stem into contact with another surface.

U.S. Pat. No. 4,311,435 to Bergero discloses a balanced power transmission device wherein a windmill propeller drives a bevel gear (30) that rotates two coupling bevel gears (32 & 34). One bevel gear (32) is free to rotate around a shaft (36) while the second bevel gear (34) can freely rotate around a sleeve (38). Two pawls (40 & 44) individually engage these bevel gears (32 & 34) so that these gears will drive the shaft (36) and the sleeve (38), respectively. This rotational energy is transmitted to a lower transmission box where bevel gears (52 & 54) are fixedly attached to the sleeve (38) and the shaft (36) and these gears transfer this rotational energy via a coupling bevel gear to a driving shaft (22) connected to a motor. This device cancels all torque in the vertical drive shaft thereby eliminating the need for a yaw control device to maintain the propeller blades facing into the wind. This disclosure uses bevel gears to transfer rotational movement from one axis to another and thereby rotate a shaft perpendicular to the input rotational motion.

U.S. Pat. No. 4,406,561 to Ewing discloses a rod assembly designed to resist breakage at the junction of the threaded and unthreaded portion of the rod by providing structural reinforcement and a seal to prevent corrosive fluids from reaching the threads. The assembly comprises a connector with a threaded pin end (26), a tool receiving shank (14) and a socket (20) with a threaded portion and a flange (24). A threaded rod (10) is threaded into the socket and then an extruding tool is used to extrude the flange so that it deforms around the rod (10) above the threads and thus form both a structural reinforcement and a seal. This disclosure shows that a threaded stud can be coupled securely with a threaded socket to form a rod that will withstand high tensile stress.

U.S. Pat. No. 4,500,224 to Ewing discloses a coupling mechanism similar to the coupling described in U.S. Pat. No. 4,406,561 to Ewing. In this disclosure, the end of a rod is upset to form a head (14) of enlarged diameter. This head is threaded and mates with a partially threaded socket (24) in a connector (22). Once engaged, the threads of the rod (10) terminate next to the outer end of the threaded portion of the socket (24). A flange 28 is cold formed using an extruding die against the tapered shoulder (16) of the rod (10). This extrusion clamps the flange around the rod and tapered shoulder throughout the unthreaded portion of the socket and the head of the rod. This disclosure shows that a threaded stud can be coupled securely with a threaded socket to form a rod that will withstand high tensile stress.

U.S. Pat. No. 4,582,347 to Wilcox et al discloses a threaded quick disconnect coupling wherein the male coupler can be connected to a female coupler regardless of whether the female coupler has a threaded connection or a detent connection to secure the two couplers. A universal male coupler (18) mates with a female coupler (14) when the closed end (26) of the female coupler is inserted in the end portion (29) of the male coupler (18) until stopped by a spring-loaded check valve (35). This action moves a spring-loaded valve (24) in the female coupler to its open position and uncovers ports (23) in the female coupler. To secure the connection, a detent holder (60) mounted on the female coupler is slid onto the male coupler or a threaded wingnut (49) mounted on the female coupler is threaded onto the male coupler.

U.S. Pat. No. 4,642,837 to Nichols et al discloses a broom assembly with replaceable components. This disclosure shows a broom handle with a threaded end (15) that screws into a socket cap (5) that in turn attaches by clipping in to plastic fingers (31) with teeth that are attached to a shroud (7) that encompasses a block of broom bristles. This disclosure connects a threaded rod to an internally threaded socket by rotating the rod.

U.S. Pat. No. 5,308,184 to Bernard discloses a means of connecting concrete reinforcing rods with rotational immobility. The end of each of the reinforcing rods to be connected are upset and threaded. A threaded sleeve is then passed over the rod to be added, the threaded ends are butted together and then the threaded sleeve is rotated/threaded directly onto the threaded end of the second rod thus joining both rods without the need to rotate either rod.

U.S. Pat. No. 5,385,420 to Newman discloses a threaded snap-fit coupling assembly for hand held tools. This assembly comprises a coupling (12) with a free end (18) that can attach to a handle and a threaded male end (16) with a hex-shaped head (22)and a ridge (24) that snaps into an adapter (10) that has a male fastening and a threaded end for attaching to a hand tool. The coupling (12) snaps into a receptacle (26) of the adapter (10) and its ridge (24) locks into a mating groove (36) in the adapter.

The present invention overcomes many of the drawbacks and deficiencies of prior art fasteners and provides a unique fastener that is easy to install into structural or non-structural members to be joined and which enables quick and seamless assembly and disassembly of these members.

OBJECTS AND SUMMARY OF THE INVENTION

The present invention provides a fastener that mates with a threaded socket mounted in or integral to a structural member, a structural beam, a structural panel or any beam or panel with sufficient thickness to support a mating threaded socket. When the fastener is aligned to a threaded socket in the mating beam or panel, a spring loaded coupler shaft in the fastener presses against the mating socket threads. Rotating a tool-driven (hex wrench, screwdriver, or the like) gear rotates the coupler shaft that engages and threads into the mating socket until the two members are securely mated.

A principle object of the present invention is to provide a rigid fastener that will support large load bearing members at comparatively large spans.

Another object of the present invention is to provide a fastener that can quickly and easily couple, or non-destructively uncouple, structural or non-structural members such as beams; panels; pre-formed wall, floor, ceiling or window units; ready-to-assemble structures; and other applications such as ready-to-assemble equipment, scaffolding, tools, fencing and furniture.

Still another object of the present invention is to provide a fastener that can provide seamless joints or invisible joints.

A further object of the present invention is to provide a fastener that couples along an axis of the structural member so as to provide greater load distribution than currently used fasteners such as nails, pins, welds, screws, bolts and rivets.

Another object of the present invention is to provide a fastener that apply a precise torque to sealed or gasketed members so as to form an air and/or water tight seal between said members.

Yet another object of the present invention is to provide a fastener that provides reliable joining.

A further object of the present invention is to provide a scaleable fastener in both size and composition that can support large structural loads such as ceiling panels, wall panels, floor panels or window panels.

Still another object of the present invention is to reduce the labor required to assemble the framing for an addition to a house, to add a Florida-style room, to add a greenhouse; or to erect a garage, a pool enclosure, a utility building or similar structure.

Yet another object of the present invention is to provide a Structural Fastener that will support dense and heavy glass panels such as used in Florida rooms, greenhouses and skyscrapers.

Still another object of the present invention is to increase the length of a load-bearing span by using high-load bearing Structural Fasteners.

Another object of the present invention is to provide a scaleable Structural Fastener that can handle the load-bearing requirements of structural members used in any building project from the erection of a utility shed to the erection of a skyscraper.

A further object of the present invention is to enable manufacturers to produce shorter load-bearing members that can be assembled in a quick and efficient manner into long spans using Structural Fasteners and simple tools and thus reduce shipping and labor costs.

Yet another object of the present invention is to use the Structural Fastener to rapidly assemble or disassemble saw horses, portable work benches, scaffolding, patio, yard and other furniture using only simple hand tools.

Still another object of the present invention is to use the Structural Fastener to assemble and install long fencing units comprised of short hand-carried sizes thus reducing labor costs and the number of supporting posts required.

Other objects and advantages will be apparent from the following description of the invention, and the novel features of the invention will be particularly pointed out hereinafter in the claims.

BRIEF DESCRIPTION OF THE DRAWINGS

The invention is illustrated in the accompanying drawings in which:

FIG. 5 shows a sectional view taken along line 5—5 of FIG. 2 of an assembled dual-drive Structural Fastener with the coupler shaft fully extended.

FIG. 6 shows a sectional view taken along line 6—6 of FIG. 2 of an assembled dual-drive Structural Fastener with the coupler shaft partially retracted and about to be threaded into a mating socket.

FIG. 7 shows a sectional view taken along line 7—7 of FIG. 2 of an assembled dual-drive Structural Fastener with the coupler shaft threaded into a mating socket.

DETAILED DESCRIPTION

Figure 1:
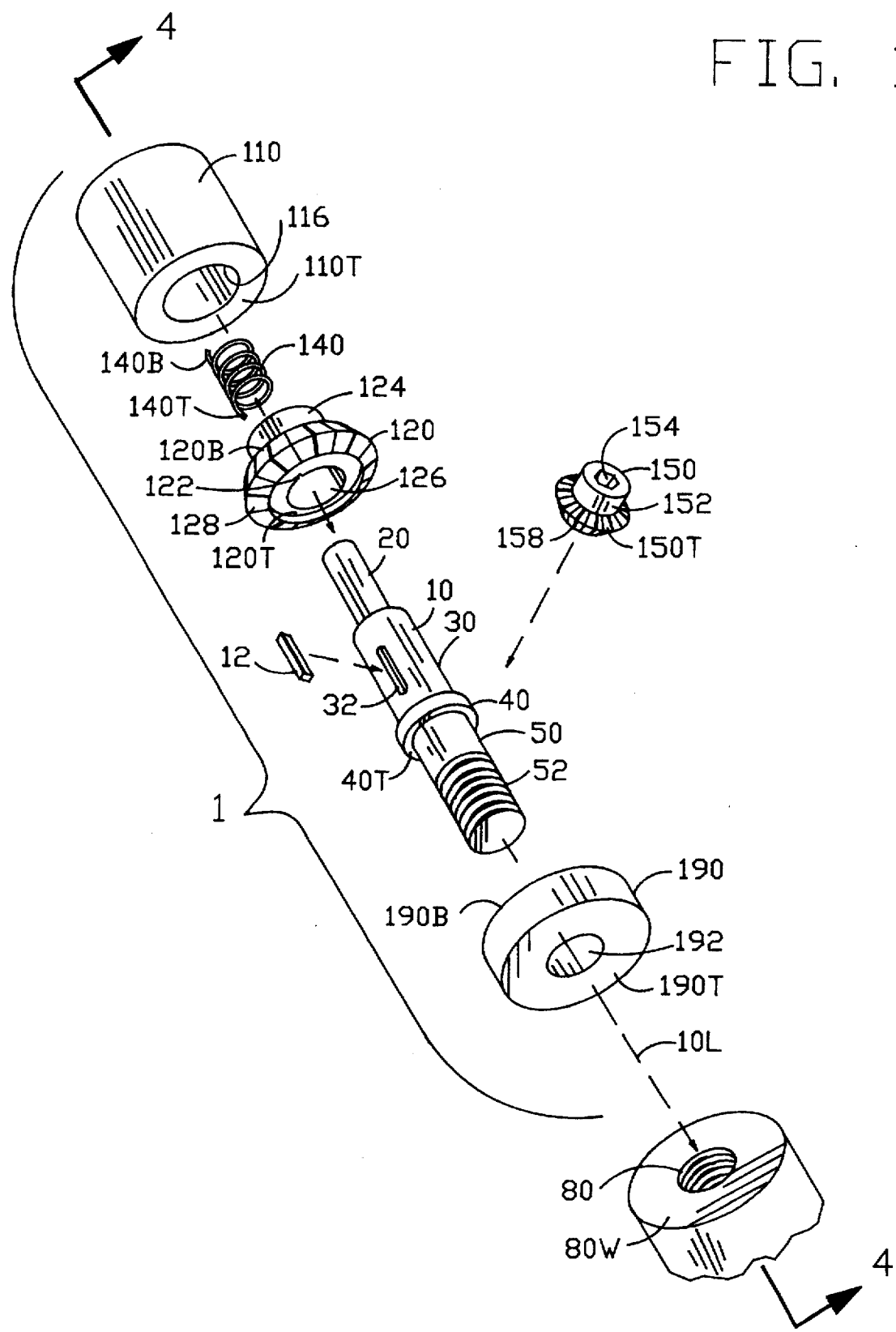
FIG. 1 shows an exploded view of a single-drive Structural Fastener.

The Structural Fastener 1 of FIG. 1 is an internal longitudinal, reversible, gear-driven interlocking screw assembly and coupling device. The Structural Fastener comprises a spring-loaded, bevel-gear assembly driven coupler shaft with a threaded stud that mates with a female threaded socket so as to form an invisible joint that is easily decoupled. The Structural Fastener incorporates a spring loaded coupler shaft that overcomes the inherent problem of precisely gearing direct drive coupling fasteners wherein the driven gear's rotational velocity must be precisely translated into a rate of rise of the threaded coupler shaft that matches the rate of rise (pitch) of the thread on the mating female section.

The application of the Structural Fastener is independent of its structural housing. That is, the Structural Fastener housing can be a cylindrical tube, a rectangular tube, a box, a regular, symmetrically-shaped housing, an irregularly shaped housing, or any other shaped housing that may be required for a particular coupling application. The Structural Fastener can be arranged in polar or linear arrays to increase its load-bearing capabilities, its air or water tight sealing capabilities or for redundancy.

The Structural Fastener provides a longitudinal coupling of members in contrast to current methods of fastening with fasteners such as nails, screws, bolts, pins and rivets which are applied perpendicular to the members joined or fastened.

The Structural Fastener is reversible, reusable and scaleable thus making it an ideal fastener for a broad range of products and applications. The Structural Fastener makes a rigid, reliable coupling between coupled members and forms a smooth external splice with no protrusions, sleeves or other fastening aids that would protrude from the original load-bearing member. The coupled joint of a finished structural member could be virtually invisible.

The addition of an O-ring or sealing gasket to the Structural Fastener or placed between the joined members can provide an air or water-tight seal. A torque wrench can be used to obtain a precise coupling force between coupled members.

Many modifications and variations of the Structural Fastener invention may be made without departing from the scope and spirit of the variations set forth herein. For ease of referencing, the variations of the Structural Fastener set forth below will be referred to as a single-drive Structural Fastener, a dual-drive Structural Fastener, a pinned Structural Fastener and a worm-drive Structural Fastener. As will be apparent from the description of the various embodiments wherein common functional elements are shared, these elements are not to be construed in a limiting sense as applying to only a single embodiment.

Single-Drive Structural Fastener

The single-drive Structural Fastener 1 of FIG. 1 comprises:

a ring gear housing 110 of FIG. 1;

a ring gear drive unit 120 of FIG. 1 with a keyslot 122 of FIG. 1;

a helical spring 140 of FIG. 1;

a coupler shaft 10 of FIG. 1;

a pinion gear 150 of FIG. 1; and a front support 190 of FIG. 1;

all enclosed in a suitable housing, not shown in FIG. 1. The assembled Structural Fastener of FIG. 1 is shown in cross-section in FIG. 4 enclosed in a housing 70.

Figure 4:
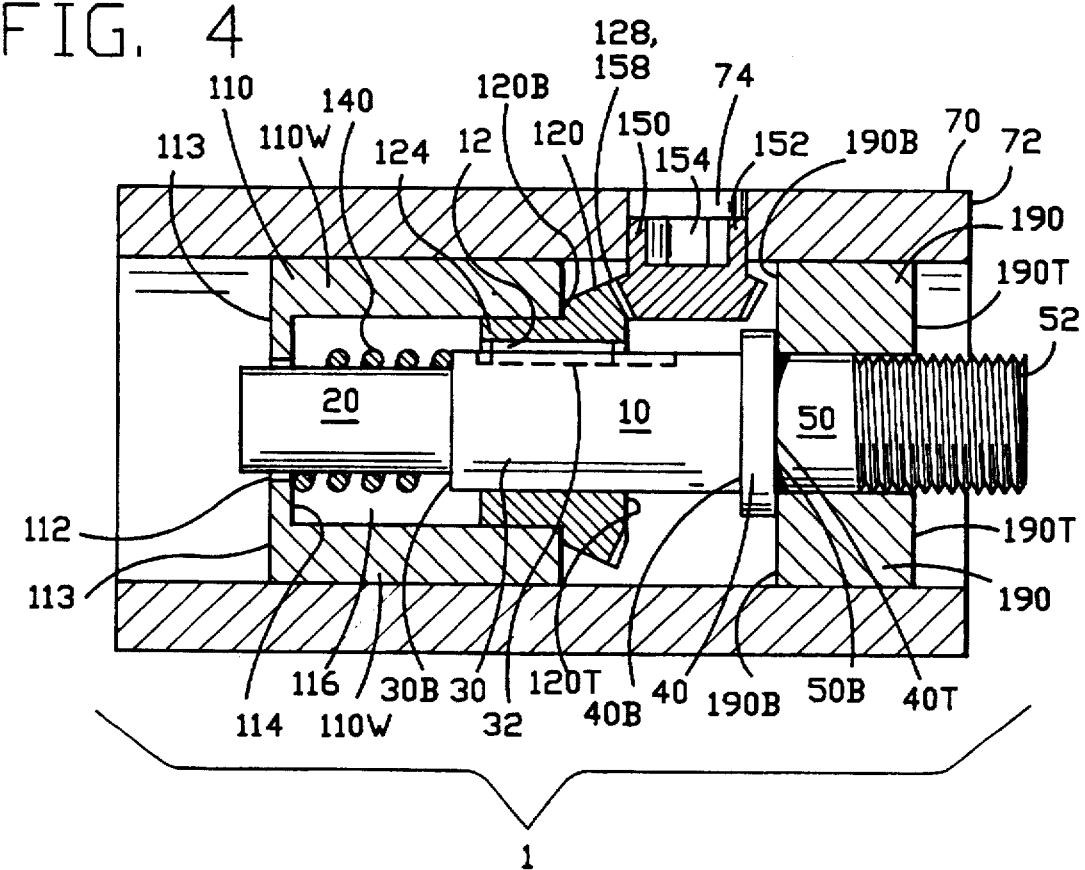
FIG. 4 shows a sectional view taken along line 4—4 of FIG. 1 of an assembled single-drive Structural Fastener.

The ring gear housing 110 of FIG. 1 functions as a rear stop for the components of the Structural Fastener, a support housing for the coupler shaft 10 and the ring gear drive unit 120, and provides a spring stop surface 114 of FIG. 4 upon which the bottom end 140B of FIG. 1 of spring 140 rests. The ring gear housing 110 comprises a longitudinal object with a bottom section 113 of FIG. 4, a circular bottom aperture 112 of FIG. 4 that passes through this bottom section 113, said bottom aperture 112 having an inside diameter greater than the outside diameter of an end segment 20 of FIG. 4 of coupler shaft 10, longitudinal walls 110W of FIG. 4 with a length equal to or greater than the length of a ring gear extension 124 of FIGS. 1 and 4, and a top aperture 116 of FIG. 1 having an inside diameter greater than the outside diameter of the ring gear extension 124 of FIG. 1, said aperture 116 extending a length equal to or greater than the length of the ring gear extension 124 of FIG. 1. The external shape of the ring gear housing 110 can be cylindrical as shown in FIG. 1, rectangular, polygonal or any shape required by a specific application that accommodates internal circular apertures to support the coupler shaft 10 and the ring gear drive unit 120.

The ring gear drive unit 120 of FIG. 1 interacts with pinion gear 150 and coupler shaft 10 so as to rotate and drive a threaded end 52 of FIGS. 1 and 4 into a mating female threaded socket 80 of FIG. 1. This gear can use a modified off-the-shelf bevel-type gear [such as Boston Gear part No. L148Y-G] in some variations and comprises:

a cylindrical ring gear extension 124 of FIGS. 1 and 4 with an outside diameter less than the inside diameter of the top aperture 116 and a length less than the length of the wall 110W of the ring gear housing 110;

a gear teeth section 128 of FIG. 1 whose teeth are selected in terms of quantity, size, and spacing to mesh with the pinion gear teeth 158 of FIG. 1, the ratio of pinion gear teeth 158 to gear teeth 128 being one-to-one, one-to-two, or any convenient ratio as suits the ease of manufacture, the sizing of the Structural Fastener, or the application; and an outside diameter of this gear teeth section 128 sized to cause the gear teeth 128 of FIGS. 1 and 4 to overlap and mesh with the gear teeth 158 of the pinion gear 150;

a central, cylindrical aperture 126 of FIG. 1 that extends along the longitudinal axis of the ring gear drive unit 120, from end-to-end, and whose inside diameter is greater than the outside diameter of a keyed segment 30 of FIGS. 1 and 4 of coupler shaft 10;

a keyslot 122 of FIG. 1 located in the cylindrical wall of aperture 126, this keyslot extending longitudinally from end-to-end, and the width and depth of this keyslot being greater than the width and depth of a mating key 12 of FIG. 1 when said key is mounted in a retainer slot 32 of FIG. 1 of coupler shaft 10;

a circular top surface 120T of FIG. 1 that extends from the cylindrical wall of aperture 126 to the base of the gear tooth section 128 and that provides a rear stop for a collar 40 of coupler shaft 10.

The helical spring 140 of FIGS. 1 and 4 provides a compressive force on coupler shaft 10 that forces the threaded end 52 to extend pass a top end 190T of FIG. 4 and pass an outside edge 72 of housing 70 so as to be available to be threaded into a mating female threaded socket 80 of FIG. 1 when the coupler shaft 10 is rotated. The spring 140 is positioned to encircle the end segment 20 of the coupler shaft 10, the top end 140T of FIG. 1 of spring 140 butts into a bottom end 30B of FIG. 4 of keyed segment 30, and the spring's bottom end 140B of FIG. 1 sits on the spring stop surface 114 of FIG. 4 of the ring gear housing 110. When the Structural Fastener is assembled, the spring is compressed between the bottom end 30B of the keyed segment and the spring stop surface 114 of FIG. 4. The inside diameter of spring 140 is greater than the outside diameter of the end segment 20 of coupler shaft 10, the outside diameter is less than the inside diameter of aperture 126 of the ring gear drive unit 120, and the length is selected to provide a compressive force on coupler shaft 10 in an assembled Structural Fastener. Spring 140 can be an off-the-shelf compressive spring sized to fit the scale of the Structural Fastener or it can be custom manufactured to suit a particular application.

The coupler shaft 10 of FIG. 1 provides a threaded end that couples with a mating female threaded socket thus providing a longitudinal coupling that can provide greater load distribution than currently used fasteners and virtually seamless joining. The coupler shaft 10 is an integrated, multi-segmented, multi-sized shaft comprising:

- a cylindrical end segment 20 of FIGS. 1 and 4 that penetrates the bottom aperture 112 of FIG. 4, that is supported by the ring gear housing 110, that is encircled in part by helical spring 140, and that has an outer diameter that is less than the inside diameter of the bottom aperture 112;

- a keyed segment 30 of FIGS. 1 and 4 that has an outside diameter greater than or equal to the outside diameter of helical spring 140 and less than the inside diameter of aperture 126, that has a bottom end 30B of FIG. 4 that provides a stop for the top end 140T of spring 140, that has a length extending from the bottom end 30B of FIG. 4 to the bottom end 40B of collar 40, said length being greater than the length of the ring gear drive unit 120, and that provides a longitudinal retainer slot 32 for key 12 of FIGS. 1 and 4, said slot sized and shaped to accept key 12;

- a key 12 that mounts in retainer slot 32, is shaped to mate with and be free to move longitudinally in keyslot 122 of the ring gear drive unit 120, and with a length greater than the length of the ring gear drive unit 120;

- a cylindrical collar 40 of FIGS. 1 and 4 that limits the longitudinal distance traversed by the coupler shaft 10 from the top end 120T of the ring gear drive unit 120 to the bottom end 190B of the front support 190 and that has an outside diameter greater than the inside diameter of aperture 126 of ring gear drive unit 120 and greater than the inside diameter of an aperture 192 of FIG. 1 of the front support 190;

- a cylindrical coupling segment 50 of FIGS. 1 and 4 that comprises a longitudinal shaft with an unthreaded segment and a threaded end 52, said threaded end 52 sized and threaded to threadedly penetrate the female threaded socket 80 of FIG. 1 to a depth that provides a secure fastening and/or a reliable load carrying connection, the length of said threaded end 52 being scaleable so as to meet the requirements of different connecting and load supporting applications. A large pitch thread with deep threads provides a solid and secure coupling with little risk of thread cross-over or thread stripping when the coupler shaft is under coupled loading. In some variations of the Structural Fastener, a ¾–10 thread on a ½ inch diameter shaft with a thread run of about 1.5 to 2 times the shaft diameter should provide a solid and secure coupling to a mating female socket.

The length of the coupler shaft 10 defines the length of an assembled Structural Fastener. The coupler shaft 10 extends from, and/or beyond, the bottom aperture 112 of the ring gear housing 110 to beyond the top end 190T of FIG. 4 and the outside edge 72 of the housing. The coupler shaft 10 can be pressed back along its axis and restrained so that it does not extend beyond the top end 190T of the front support 190. Any such restraint is removed to allow the coupling segment 50 to be forced against the mating socket 80.

The coupler shaft 10 can be solid or hollow. A hollow coupler shaft 10 provides cabling or piping pass-through access between joined members and can thus reduce the number of cabling or piping openings in the joined members.

The pinion gear 150 of FIGS. 1 and 4 is manually rotated by a hand or power-driven tool. This pinion gear transfers its rotational motion perpendicularly into rotation of the ring gear drive unit 120 that in turn rotates and drives coupler shaft 10. This pinion gear can use an unmodified, off-the-shelf bevel-type gear [such as Boston Gear part No. L148Y-P] in some variations and comprises:

- a cylindrical pinion gear extension 152 of FIGS. 1 and 4 that has an outside diameter less than the inside diameter of a housing aperture 74 and that has a tool-receiving receptacle sized and shaped to accept the driving element of a hand or power-driven tool such as a screwdriver, hex or Allen-style wrench, ratchet wrench, torque wrench or tools of a like type; and

- a gear teeth section 158 of FIG. 1 whose teeth are selected in terms of quantity, size, and spacing to mesh with the gear teeth 128 of the ring gear drive unit 120, the ratio of pinion gear teeth 158 to gear teeth 128 being one-to-one, one-to-two, or any convenient ratio as suits the ease of manufacture, the sizing of the Structural Fastener, or the application; and an outside diameter of this gear teeth section 158 sized to cause the gear teeth 158 of FIGS. 1 and 4 to overlap and mesh with the gear teeth 128 of the ring gear drive unit 120;

The pinion gear extension 152 of pinion gear 150 of FIG. 4 is positioned in housing aperture 74 and is free to rotate. The pinion gear is retained in this aperture in an assembled Structural Fastener by the presence of the gear teeth 128 of the ring gear drive unit 120 which are positioned perpendicular to and in contact with the pinion gear teeth 158.

The front support 190 of FIGS. 1 and 4 functions as a front stop for the components of the Structural Fastener and a support housing for the coupler shaft 10. The front support 190 comprises a longitudinal hollow object with a bottom end 190B, a circular aperture 192 of FIG. 1 that extends longitudinally through the front support, said aperture 192 having an inside diameter greater than the outside diameter of the coupling segment 50 of coupler shaft 10, and a depth selected in accordance with the needs of a particular application or so as to provide specific load support capabilities. The bottom section 190B of FIG. 4 provides a front stop for the collar 40 of coupler shaft 10. The external shape of the front support 190 can be cylindrical as shown in FIG. 1, rectangular, polygonal or any shape required by a specific application that accommodates internal circular apertures to support the coupler shaft 10.

The housing 70 of FIG. 4 encases and supports an assembled Structural Fastener 1. A method of assembling the Structural Fastener into a housing 70, said housing comprising a longitudinal cylindrical polygon with an aperture sized to receive the pinion gear extension 152, comprises (see generally FIG. 1 and 4):

- mounting pinion gear 150 into housing aperture 74 by inserting pinion gear extension 152 of FIG. 4 into housing aperture 74;
- combining ring gear drive unit 120 and ring gear housing 110 by placing the ring gear extension 124 of FIG. 1 into the ring gear housing top aperture 116 until the bottom end 120B of the ring gear drive unit contacts and is stopped by the top surface 110T of the ring gear housing 110;
- inserting said combined ring gear housing 110 and ring gear drive unit 120 into housing 70 until the gear teeth 128 of the ring gear drive unit 120 contact and mesh with the pinion gear teeth 158 of FIG. 4;
- securing the ring gear housing 110 in the housing 70 by mechanical means such as a flat-spring, a C-shaped retaining ring; a ring lock, welding; pins, bolts, or screws inserted through the housing 70; or like mechanisms, or by adhesive means whereby an epoxy, adhesive glue or the like attaches the ring gear housing 110 to housing 70;
- placing spring 140 on end segment 20 of coupler shaft 10 of FIG. 4;
- inserting said spring 20 and end segment 20 into ring gear aperture 126;
- continuing to insert coupler shaft 10 into ring gear aperture 126 and rotating coupler shaft 10 until the key 12 mounted on the keyed segment 30 of coupler shaft 10 aligns with keyslot 122;
- continuing to insert coupler shaft 10 into ring gear aperture 126 until end segment 20 passes into and through the bottom aperture 112 of FIG. 4 of the ring gear housing 110 and a return force (bounce) is applied to the coupler shaft 10 by the compression of spring 140 between the spring stop 114 of the ring gear housing 110 and the bottom end 30B of the keyed segment 30 of the coupler shaft 10;
- sliding front support 190 onto the coupling segment 50 of FIGS. 1 and 4 until the bottom end 190B contacts the top end 40T of the collar 40;
- applying pressure to the front support 190 along the longitudinal axis of the coupler shaft 10 so as to continue to slide the front support 190 into the housing 70 until the bottom end 190B is distanced from the outer edge of the pinion gear teeth 158 in accordance with the needs of the application; securing the front support 190 to the housing 70 by mechanical means such as a flat-spring, a C-shaped retaining ring; a ring lock, welding; pins, bolts, or screws inserted through the housing 70; or like mechanisms, or by adhesive means whereby an epoxy, adhesive glue or the like attaches the front support 190 to housing 70.

This method of assembling the basic Structural Fastener may be readily modified to accommodate various means of manufacture or to fit the needs of various applications.

The assembled components of a Structural Fastener mounted in a housing interact as follows:

- the longitudinal axis 10L of FIG. 1 of the coupler shaft 10 is aligned to the longitudinal axis of the female socket 80;
- the helical spring 140, being compressed between the spring stop 114 of FIG. 4 and the bottom end 30B of the keyed segment 30, exerts a compressive force on coupler shaft 10 that forces the threaded end 52 to extend pass the front support's top end 190T and pass the outside edge 72 of housing 70; the Structural Fastener is positioned such that the outside edge 72 of the housing or the top end 190 of the front support contacts the entry wall 80W of FIG. 1; this positioning forces the coupler shaft rearward into the fastener and further compresses the spring 140;
- pinion gear 150 is rotated by a tool inserted into the pinion gear tool receiving receptacle 154 of FIG. 4;
- the rotational motion of the pinion gear 150 is translated via pinion gear teeth 158 and ring gear drive unit teeth 128 into rotation of ring gear drive unit 120;
- the rotation of ring gear drive unit 120 is translated via key 12 and keyslot 122 into rotation of coupler shaft 10 and thus rotation of the threaded end 52;
- the rotation of threaded end 52 combined with the forward thrust provided by the compressed spring 140 causes the threaded end 52 to thread itself into the mating female threaded socket 80 of FIG. 1;
- as the threaded end 52 threadedly enters socket 80, the collar 40 of coupler shaft 10 advances until said collar contacts the bottom end 190B of the front support 190;
- continued rotation of the pinion gear 150 causes the threaded end 52 to thread deeper into socket 80, thus further advancing collar 40, said collar transmitting a force via the front support that moves the Structural Fastener and/or its housing into contact with entry wall 80W;
- further rotational torque applied to pinion gear 150 increases the torque applied to the threaded end (stud) and socket connection but will not result in any further rotation of the coupler shaft 10; the Structural Fastener is now connected to the socket 80.

Non-destructive decoupling is similar to the above. Rotation of the pinion gear 150 in a direction opposite that of the rotation used to threadedly connect the coupler shaft 10 to the socket 80 causes:

- the ring gear drive unit 120 to rotate the coupler shaft 10 in a direction opposite to the coupling rotational direction;
- this opposite rotation is conveyed via keyslot 122 and key 12 to the coupler shaft 10;
- coupler shaft 10 then rotates in a direction opposite to the coupling rotational direction; this opposite rotation causes the threaded end 52 to unthread out of socket 80;
- when threaded end 52 withdraws from the threaded portion of socket 80, coupler shaft 10 is uncoupled;

A disconnected coupler shaft 10 continues to maintain the threaded end in an extended position due to the force applied along the longitudinal axis of the coupler shaft by spring 140.

Dual-Drive Structural Fastener

Figure 2:
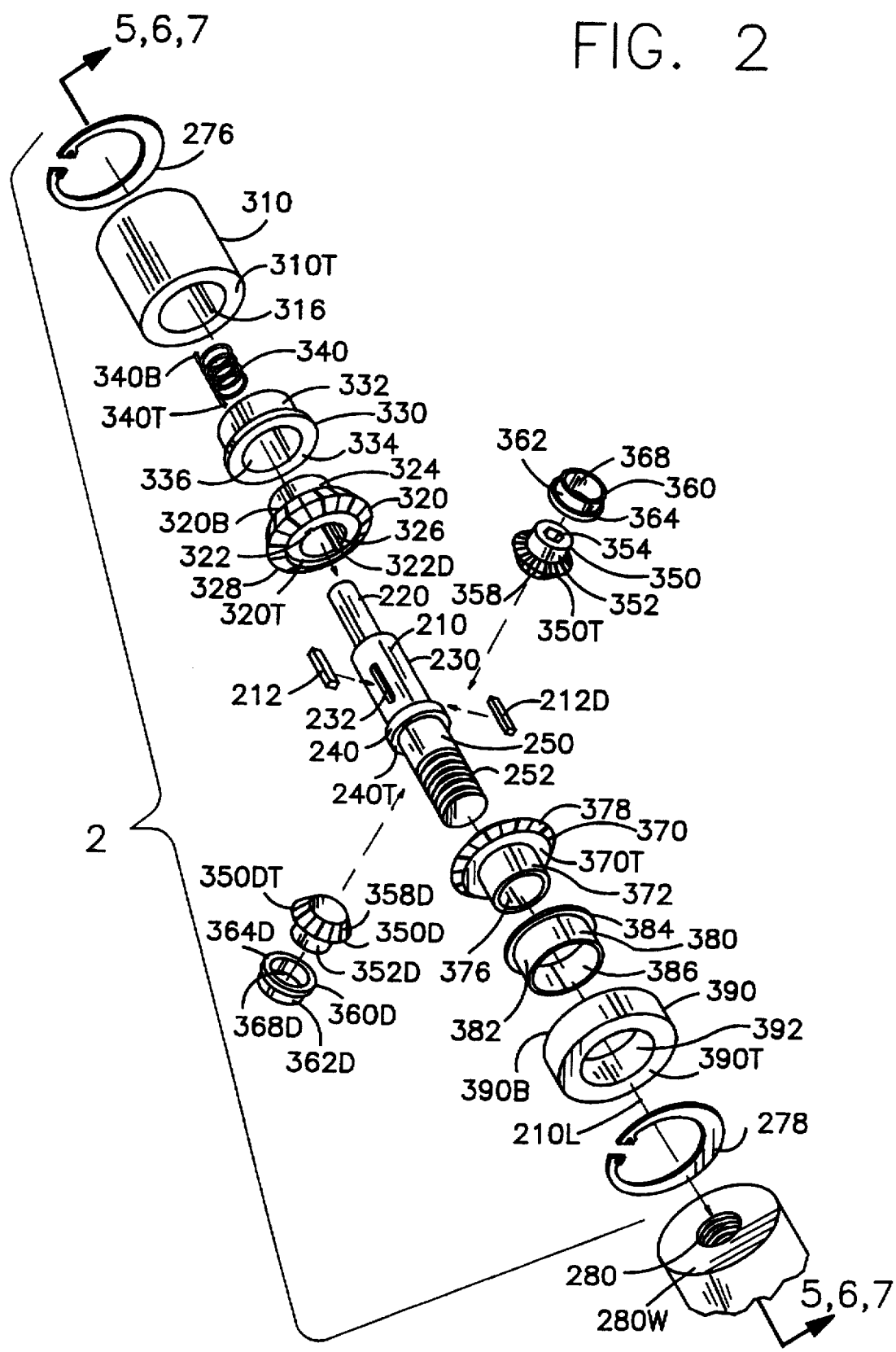
FIG. 2 shows an exploded view of a dual-drive Structural Fastener.

The dual-drive Structural Fastener 2 of FIG. 2 comprises:
- a ring gear housing 310 of FIGS. 2 and 5;
- a ring gear bushing 330 of FIGS. 2 and 5;
- a ring gear drive unit 320 of FIGS. 2 and 5 with keyslots 322 and 322D;
- a helical spring 340 of FIGS. 2 and 5;
- a coupler shaft 210 of FIGS. 2 and 5;

a first and a second pinion gear 350 and 350D, respectively, of FIGS. 2 and 5;

a first and a second pinion gear bushing 360 and 360D, respectively, of FIGS. 2 and 5;

an idler gear 370 of FIGS. 2 and 5;

an idler gear bushing 380 of FIGS. 2 and 5; and a front support 390 of FIGS. 2 and 5;

all enclosed in a suitable housing such as shown in FIG. 5 and retained in said housing by a rear retaining ring 276 of FIGS. 2 and 5 and a front retaining ring 278. The assembled Structural Fastener of FIG. 2 is shown in cross-section in FIG. 5 enclosed in a housing 270.

The rear retaining ring 276 of FIGS. 2 and 5 operates in conjunction with the front retaining ring 278 to provide a rear stop and a front stop, respectively, for holding an assembled Structural Fastener in a housing such as shown in FIG. 5. These rings comprise a flat-spring formed into a C-shape that can be compressed and inserted into a grove in the housing enclosure.

The ring gear housing 310 of FIGS. 2 and 5 functions as a rear stop for the components of the Structural Fastener; a support housing for the coupler shaft 210, ring gear bushing 330 and the ring gear drive unit 320; and provides a spring stop surface 314 of FIG. 5 upon which the bottom end 340B of FIG. 2 of spring 340 rests. The ring gear housing 310 comprises a longitudinal object with a bottom section 313 of FIG. 5, a circular bottom aperture 312 of FIG. 5 that passes through this bottom section 313, said bottom aperture 312 having an inside diameter greater than the outside diameter of an end segment 220 of FIG. 5 of coupler shaft 210, longitudinal walls 310W of FIG. 5 with a length equal to or greater than the length of ring gear extension 324 of FIGS. 2 and 5, and a top aperture 316 of FIG. 2 having an inside diameter greater than the outside diameter of a ring gear bushing extension 332 of FIG. 2, said aperture 316 extending a length equal to or greater than the length of the ring gear extension 324 of FIG. 2. The external shape of the ring gear housing 310 can be cylindrical as shown in FIG. 2, rectangular, polygonal or any shape required by a specific application that accommodates internal circular apertures to support the coupler shaft 210 and the ring gear drive unit 320.

The ring gear bushing 330 of FIGS. 2 and 5 mounts into the top aperture 316 of the ring gear housing and provides a low-friction support for the ring gear drive unit. This bushing is made of a durable, low friction material such as brass, bronze, 660 bronze, or the like. This bushing can be an unmodified off-the shelf bushing for some variations of the Structural Fastener. Bushing 330 comprises a cylindrical top collar 334 of FIG. 2, the cylindrical extension 332 and an aperture 336 extending longitudinally from end-to-end and with an inside diameter greater than the outside diameter of a ring gear drive unit extension 324 of FIG. 2.

The ring gear drive unit 320 of FIGS. 2 and 5 interacts with pinion gears 350 and 350D and with coupler shaft 210 so as to rotate and drive a threaded end 252 of FIGS. 2 and 5 into a mating female threaded socket 280 of FIGS. 2 and 5. This gear can use a modified off-the-shelf bevel-type gear [such as Boston Gear part No. L148Y-G] in some variations and comprises:

a cylindrical ring gear extension 324 of FIGS. 2 and 5 with an outside diameter less than the inside diameter of the aperture 336 and a length less than the length of the wall 310W of the ring gear housing 310;

a gear teeth section 328 of FIG. 2 whose teeth are selected in terms of quantity, size, and spacing to mesh with the pinion gear teeth 358 and 358D of FIG. 2, the ratio of said pinion gear teeth to gear teeth 328 being one-to-one, one-to-two, or any convenient ratio as suits the ease of manufacture, the sizing of the Structural Fastener, or the application; and an outside diameter of this gear teeth section sized to cause the gear teeth 328 of FIGS. 2 and 5 to overlap and mesh with the gear teeth 358 and 358D of the pinion gears 350 and 350D, respectively;

a central, cylindrical aperture 326 of FIG. 2 that extends along the longitudinal axis of the ring gear drive unit 320, from end-to-end, and whose inside diameter is greater than the outside diameter of a keyed segment 230 of FIGS. 2 and 5 of coupler shaft 210;

keyslots 322 and 322D of FIG. 1 located in the cylindrical wall of aperture 326, these keyslots being positioned 180 degrees apart or at any convenient spatial separation, these keyslots extending longitudinally from end-to-end, and the width and depth of these keyslots being greater than the width and depth of mating keys 212 and 212D of FIGS. 2 and 5 when said keys are mounted in retainer slots 232 and 232D, respectively, of FIG. 2 of coupler shaft 210;

a circular top surface 320T of FIGS. 2 and 5 that extends from the cylindrical wall of aperture 326 to the base of the gear tooth section 328 and that provides a rear stop for the collar 240 of coupler shaft 210.

The helical spring 340 of FIGS. 2 and 5 provides a compressive force on coupler shaft 210 that forces the threaded end 252 to extend pass a top end 390T of FIG. 5, through the front retaining ring 278, and pass an outside edge 272 of housing 270 so as to be available to be threaded into a mating female threaded socket 280 of FIGS. 2 and 5 when the coupler shaft 210 is rotated. The spring 340 is positioned to encircle the end segment 220 of the coupler shaft 210, the top end 340T of FIG. 2 of spring 340 butts into a bottom end 230B of FIG. 5 of keyed segment 230, and the spring's bottom end 340B of FIG. 2 sits on the spring stop surface 314 of FIG. 5 of the ring gear housing 310. When the Structural Fastener is assembled, the spring is compressed between the bottom end 230B of the keyed segment and the spring stop surface 314 of FIG. 5. The inside diameter of spring 340 is greater than the outside diameter of the end segment 220 of coupler shaft 210, the outside diameter is less than the inside diameter of aperture 336 of the ring gear bushing 330, and the length is selected to provide a compressive force on coupler shaft 210 in an assembled Structural Fastener. Spring 340 can be an off-the-shelf helical spring sized to fit the scale of the Structural Fastener or it can be custom manufactured to suit a particular application.

The coupler shaft 210 of FIG. 2 provides a threaded end that couples with a mating female threaded socket thus providing a longitudinal coupling that can provide greater load distribution than currently used fasteners and virtually seamless joining. The coupler shaft 210 is an integrated, multi-segmented, multi-sized shaft comprising:

a cylindrical end segment 220 of FIGS. 2 and 5 that penetrates the bottom aperture 312 of FIG. 5, that is supported by the ring gear housing 310, that is encircled in part by spring 340, and that has an outer diameter that is less than the inside diameter of the bottom aperture 312;

a dual keyed segment 230 of FIGS. 2 and 5 that has an outside diameter greater than or equal to the outside diameter of helical spring 340 and less than the inside diameter of aperture 326, that has a bottom end 230B of FIG. 5 that provides a stop for the top end 340T of spring 140, that has a length extending from the bottom end 230B of FIG. 5 to the bottom end 240B of collar 240, said length being greater than the length of the ring gear drive unit 320, and that provides longitudinal retainer slots 232 and 232D for keys 212 and 212D, respectively, of FIGS. 1 and 5, said slots sized and shaped to accept said keys;

keys 212 and 212D of FIGS. 1 and 5 that mount in retainer slots 232 and 232D, respectively, said keys shaped to mate with and be free to move longitudinally in keyslots 322 and 322D, respectively, of the ring gear drive unit 320, and with a length greater than the length of the ring gear drive unit 320;

a cylindrical collar 240 of FIGS. 2 and 5 that limits the longitudinal distance traversed by the coupler shaft 210 from the top end 320T of the ring gear drive unit 320 to the bottom end 370B of the idler gear 370 of FIG. 5 and that has an outside diameter greater than the inside diameter of aperture 326 of ring gear drive unit 320 and greater than the inside diameter of an aperture 376 of FIG. 2 of the idler gear 370;

a cylindrical coupling segment 250 of FIGS. 2 and 5 that comprises a longitudinal shaft with an unthreaded segment and a threaded end 252, said threaded end 252 sized and threaded to threadedly penetrate the female threaded socket 280 of FIGS. 2 and 5 to a depth that provides a secure fastening and/or a reliable load carrying connection, the length of said threaded end 252 being scaleable so as to meet the requirements of different connecting and load supporting applications. A large pitch thread with deep threads provides a solid and secure coupling with little risk of thread cross-over or thread stripping when the coupler shaft is under coupled loading. In some variations of the Structural Fastener, a ¾–10 thread on a ½ inch diameter shaft with a thread run of about 1.5 to 2 times the shaft diameter should provide a solid and secure coupling to a mating female socket.

The length of the coupler shaft 210 defines the length of an assembled Structural Fastener. The coupler shaft 210 extends from, and/or beyond, the bottom aperture 312 of the ring gear housing 310 to beyond the top end 390T of FIG. 5 and the outside edge 272 of the housing. The coupler shaft 210 can be pressed back along its axis and restrained so that it does not extend beyond the top end 390T of the front support 390. Any such restraint is removed to allow the coupling segment 250 to be forced against the mating socket 280.

The coupler shaft 210 can be solid or hollow. A hollow coupler shaft 210 provides cabling or piping pass-through access between joined members and can thus reduce the number of cabling or piping openings in the joined members.

Either pinion gear 350 or 350D of FIGS. 2 and 5 is manually rotated by a hand or power-driven tool. Said pinion gear transfers its rotational motion perpendicularly into rotation of the ring gear drive unit 320 that in turn rotates and drives coupler shaft 210. These pinion gears can use unmodified, off-the-shelf bevel-type gears [such as Boston Gear part No. L148Y-P] in some variations. Each pinion gear 350 or 350D comprises:

a cylindrical pinion gear extension 352 or 352D of FIGS. 2 and 5 that has an outside diameter less than the inside diameter of a housing aperture 274 and that has a tool-receiving receptacle sized and shaped to accept the driving element of a hand or power-driven tool such as a screwdriver, hex or Allen-style wrench, ratchet wrench, torque wrench or tools of a like type; and gear teeth 358 or 358D of FIG. 2 whose teeth are selected in terms of quantity, size, and spacing to mesh with the gear teeth 328 of the ring gear drive unit 320, the ratio of pinion gear teeth to gear teeth 328 being one-to-one, one-to-two, or any convenient ratio as suits the ease of manufacture, the sizing of the Structural Fastener, or the application; and an outside diameter of this gear teeth section sized to cause the gear teeth 358 and 358D of FIGS. 2 and 5 to overlap and mesh with the gear teeth 328 of the ring gear drive unit 320;

The pinion gear extension 352 of pinion gear 350 of FIG. 5 is positioned in pinion gear bushing 360 which is fixedly mounted in housing aperture 274; the pinion gear being free to rotate. The pinion gear extension 352D of pinion gear 350D of FIG. 5 is positioned in pinion gear bushing 360D which is fixedly mounted in housing aperture 274D; the pinion gear being free to rotate. The pinion gears are retained in the housing apertures in an assembled Structural Fastener by the presence of the gear teeth 328 of the ring gear drive unit 320 and by the presence of the gear teeth 378 of the idler gear 370, both of which are positioned perpendicular to and in contact with the pinion gear teeth.

Pinion gear bushings 360 and 360D of FIGS. 2 and 5 mount into housing apertures 274 and 274D, respectively, and provide a low-friction support for the pinion gears 350 and 350D, respectively. These bushings are made of a durable, low friction material such as brass, bronze, 660 bronze, or the like. These bushings can be an unmodified off-the shelf bushing for some variations of the Structural Fastener. Bushings 350 and 350D comprise a cylindrical bottom collar 364 and 364D, respectively, of FIG. 2, a cylindrical extension 362 and 362D, respectively, and an aperture 368 and 368D, respectively, extending longitudinally from end-to-end and with an inside diameter greater than the outside diameter of the pinion gear extension 352 of 352D, respectively, of FIG. 2.

The idler gear 370 of FIGS. 2 and 5 functions as a front stop for the collar 240 of the coupler shaft 210, provides a stabilizing support for pinion gears 350 and 350D and reduces the torque that tends to bind the coupler shaft in a single-drive Structural Fastener. This gear can use a unmodified off-the-shelf bevel-type gear [such as Boston Gear part No. L148Y-G] in some variations and comprises:

a cylindrical ring gear extension 372 of FIG. 2 with an outside diameter less than the inside diameter of a front support aperture 392;

gear teeth 378 of FIGS. 2 and 5 whose teeth are selected in terms of quantity, size, and spacing to mesh with the pinion gear teeth 358 and 358D, the ratio of pinion gear teeth to gear teeth 328 being one-to-one, one-to-two, or any convenient ratio as suits the ease of manufacture, the sizing of the Structural Fastener, or the application; and an outside diameter of this gear teeth section sized to cause the gear teeth 378 of FIGS. 2 and 5 to overlap and mesh with the gear teeth 358 and 358D of the pinion gears 350 and 350D, respectively;

a central, cylindrical aperture 376 of FIG. 2 that extends along the longitudinlal axis of the idler gear 370, from end-to-end, and whose inside diameter is greater than the outside diameter of the coupling segment 250 of coupler shaft 210;

The idler gear bushing 380 of FIGS. 2 and 5 mounts into the aperture 392 of the front support 390 and provides a low-friction support for the idler gear. This bushing is made of a durable, low friction material such as brass, bronze, 660 bronze, or the like. This bushing can be an unmodified off-the shelf bushing for some variations of the Structural Fastener. Bushing 380 comprises a cylindrical top collar 384 of FIG. 2, a cylindrical extension 382 and an aperture 386 extending longitudinally from end-to-end and with an inside diameter greater than the outside diameter of the idler gear extension 372 of FIG. 2.

The front support 390 of FIGS. 2 and 5 functions as a front stop for the components of the Structural Fastener and as a support housing for the coupler shaft 210, idler gear bushing 380 and idler gear 370. The front support 390 comprises a longitudinal hollow object with a bottom end 390B, a circular aperture 392 of FIG. 2 that extends longitudinally through the front support, said aperture 392 having an inside diameter greater than the outside diameter of the idler gear bushing extension 372, and a depth selected in accordance with the needs of a particular application or so as to provide specific load support capabilities. The bottom section 390B of FIG. 5 provides a stop for the bushing 380 and idler gear 370. The external shape of the front support 390 can be cylindrical as shown in FIG. 2, rectangular, polygonal or any shape required by a specific application that accommodates internal circular apertures to support the coupler shaft 210.

The housing 270 of FIG. 5 encases and supports an assembled Structural Fastener. A method of assembling the Structural Fastener into a housing 270, said housing comprising a longitudinal cylindrical polygon with apertures sized to receive pinion gear bushings 360 and 360D and circular slots cut into the interior of said housing, said slots sized and spaced so as to form front and rear retaining slots when C-shaped, flat spring retaining rings are installed, comprises (see generally FIGS. 2 and 5):

fixedly mounting pinion gear bushing 360 in housing aperture 274;

fixedly mounting pinion gear bushing 360D in housing aperture 274D;

mounting pinion gear 350 into pinion gear bushing 360 by inserting pinion gear extension 352 of FIG. 2 into the bushing aperture 368;

mounting pinion gear 350D into pinion gear bushing 360D by inserting pinion gear extension 352D of FIG. 2 into the bushing aperture 368D;

assembling ring gear drive unit 320, ring gear bushing 330 and ring gear housing 310 into a rear combined unit by placing the ring gear bushing extension 332 of FIG. 2 into the ring gear housing top aperture 316 until the bushing collar 334 contacts and is stopped by the top surface 310T of the ring gear housing 310; then placing the ring gear drive unit extension 324 into the ring gear bushing aperture 336 until the bottom end 320B of the ring gear drive unit contacts and is stopped by the bushing collar 334;

inserting said rear combined unit into housing 270 until the gear teeth 328 of the ring gear drive unit 320 contact and mesh with the pinion gear teeth 358 and 358D of FIGS. 2 and 5;

securing said rear combined unit in the housing 270 by mounting the rear retaining ring 276 into a mating rear slot in the housing 270; or by other mechanical means such as welding; pins, bolts, or screws inserted through the housing; or like mechanisms, or by adhesive means whereby an epoxy, adhesive glue or the like attaches the ring gear housing 310 of the rear combined unit to the housing;

placing spring 340 on end segment 220 of coupler shaft 210;

inserting said spring 220 and end segment 220 into ring gear aperture 326 of FIG. 2;

continuing to insert coupler shaft 210 into ring gear aperture 326 and rotating coupler shaft 210 until the keys 212 and 212D mounted on the keyed segment 230 of coupler shaft 210 align with keyslots 322 and 322D;

continuing to insert coupler shaft 210 into ring gear aperture 326 until end segment 220 passes into and through the bottom aperture 312 of FIG. 5 of the ring gear housing 310 and a return force (bounce) is applied to the coupler shaft 210 by the compression of spring 340 between the spring stop 314 of the ring gear housing 310 and the bottom end 230B of the keyed segment 230 of the coupler shaft 210;

assembling idler gear 370, idler gear bushing 380 and the front support 390 into a front support unit by placing the idler gear bushing extension 380 into the front support aperture 392 until the bushing collar 384 contacts and is stopped by the bottom end 390B of the front support, then placing the idler gear extension 372 into the idler gear bushing aperture 386 until the top end 370T of the idler gear 370 contacts and is stopped by the bushing collar 384;

sliding said front support unit onto the coupling segment 250 of FIGS. 2 and 5, while applying pressure along the longitudinal axis of the coupler shaft, until the gear teeth 378 of the idler gear 370 contact and mesh with the pinion gear teeth 358 and 358D;

securing said front support unit to the housing 270 by mounting the front retaining ring 278 into a mating front slot in the housing 270; by other mechanical means such as welding; pins, bolts, or screws inserted through the housing; or like mechanisms, or by adhesive means whereby an epoxy, adhesive glue or the like attaches the front support 390 of the front support unit to the housing.

This method of assembling the Structural Fastener may be readily modified to accommodate various means of manufacture or to fit the needs of various applications.

The assembled components of a dual-drive Structural Fastener mounted in a housing interact as follows:

the longitudinal axis 210L of FIG. 2 of the coupler shaft 210 is aligned to the longitudinal axis of the female socket 280;

the helical spring 340, being compressed between the spring stop 314 of FIG. 5 and the bottom end 230B of the keyed segment 230, exerts a compressive force on coupler shaft 210 that forces the threaded end 252 to extend pass the front support's top end 390T and pass the outside edge 272 of housing 270;

the Structural Fastener is positioned such that the outside edge 272 of the housing contacts the entry wall 280W of FIG. 6; this positioning forces the coupler shaft 210 of FIG. 6 rearward into the fastener and further compresses the spring 340;

pinion gear 350 or 350D is rotated by a tool inserted into the pinion gear tool receiving receptacle 354 or 354D, respectively, of FIG. 6;

the rotational motion of said pinion gear is translated via pinion gear teeth 358 or 358D and ring gear drive unit teeth 328 into rotation of ring gear drive unit 320;

the rotation of ring gear drive unit 320 is translated via keys 212, 212D and keyslots 322, 322D into rotation of coupler shaft 210 and thus rotation of the threaded end 252 of FIG. 6;

the rotation of threaded end 252 combined with the forward thrust provided by the compressed spring 340 causes the threaded end 252 to thread itself into the mating female threaded socket 280 of FIG. 6;

as the threaded end 252 threadedly enters into socket 280 of FIG. 7, the collar 240 of coupler shaft 210 advances until said collar contacts the bottom end 370B of the idler gear 370 of FIG. 7;

continued rotation of said pinion gear causes the threaded end 252 to thread deeper into socket 280 of FIG. 7, thus advancing collar 240, said collar transmitting a force via the idler gear 370 that moves the Structural Fastener or its housing into contact with entry wall 280W;

further rotational torque applied to said pinion gear increases the torque applied to the threaded end (stud) and socket connection but will not result in any further rotation of the coupler shaft 210; the Structural Fastener is now connected to the socket 280.

Non-destructive decoupling is similar to the above. Rotation of the pinion gear 350 or 350D of FIG. 7 in a direction opposite that of the rotation used to threadedly connect the coupler shaft 210 to the socket 280 causes:

the ring gear drive unit 320 of FIG. 7 to rotate the coupler shaft 210 in a direction opposite to the coupling rotational direction;

this opposite rotation is conveyed via keyslots 322, 322D and keys 212, 212D to the coupler shaft 210;

coupler shaft 210 then rotates in a direction opposite to the coupling rotational direction; this opposite rotation causes the threaded end 252 to unthread out of socket 280;

when threaded end 252 withdraws from the threaded portion of socket 280, coupler shaft 210 is uncoupled; A disconnected coupler shaft 210 continues to maintain the threaded end in an extended position due to the force applied along the longitudinal axis of the coupler shaft by spring 340.

Pinned Structural Fastener

Figure 3:
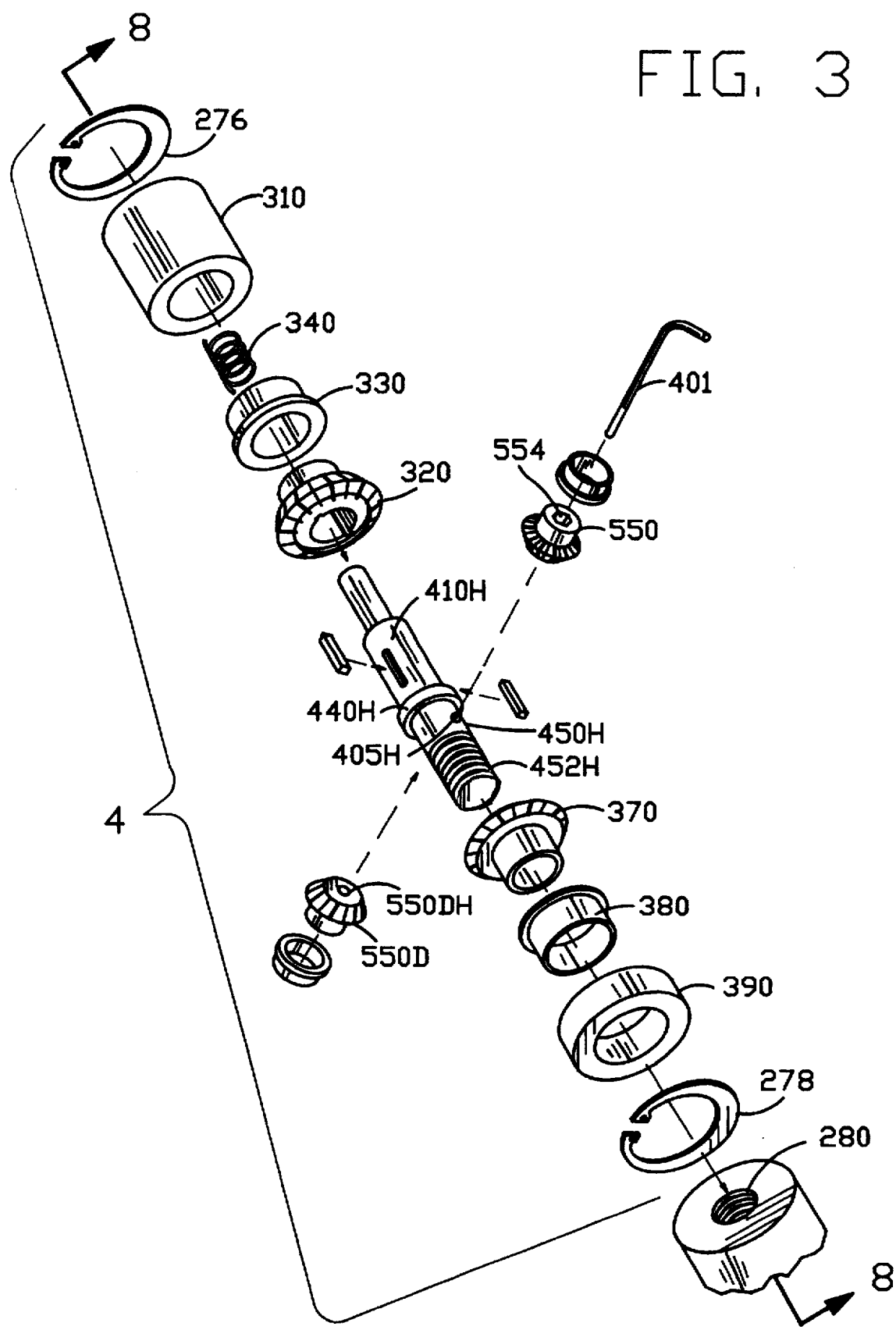
FIG. 3 shows an exploded view of a dual-drive Structural Fastener modified to accept a coupler shaft restraining pin.
Figure 8:
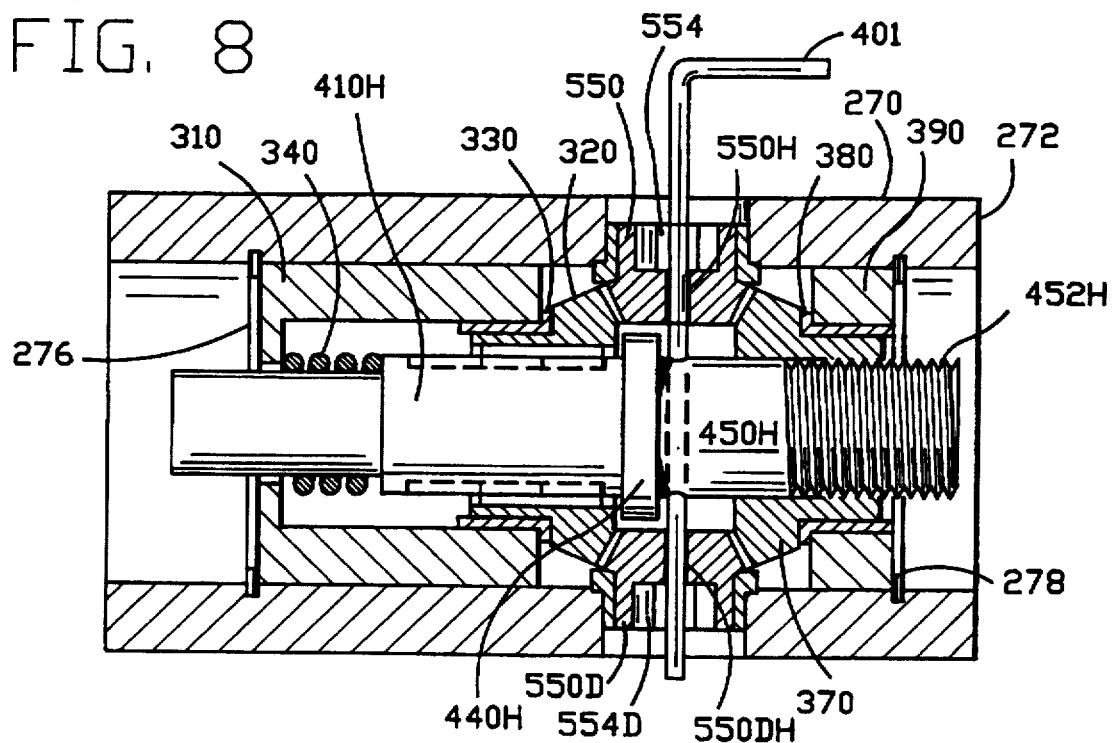
FIG. 8 shows a sectional view taken along line 8—8 of FIG. 3 of an assembled Structural Fastener with a restraining pin.

Another variation of the Structural Fastener of this invention is to incorporate a means of restraining the spring-loaded coupler shaft so that the threaded end of said shaft does not protrude pass the front retaining ring or the outside edge of the housing. A means of restraining said coupler shaft using a restraining pin 401 of FIGS. 3 and 8 is described below using a modified dual-drive structural fastener as hereinbefore described. Although, not described, this variation applies in a like manner to the single-drive Structural Fastener hereinbefore described. Many other variations and modifications will be readily apparent to those skilled in the art and this particular embodiment is not to be construed in the limiting sense.

The pinned Structural Fastener is ideally suited for applications wherein prefabricated sections, panels, beams, supports, or like members without edge protrusions are mated to presized openings such as when a polygonal window unit is slid into a presized frame with integrated threaded sockets spaced around said frame.

The pinned Structural Fastener 4 of FIG. 3 embodiment comprises a Structural Fastener modified to accept a restraining pin. This modification comprises boring holes with a diameter greater than the diameter of the restraining pin 401 through:

a coupler shaft 410H wherein a cylindrical bore 405H of FIG. 3 passes through a coupling segment 450H;

a first pinion gear 550 of FIGS. 3 and 8 wherein a cylindrical bore 550H of FIG. 8 passes through the center of said pinion gear and through the center of the tool receiving receptacle 554; and a second pinion gear 550D of FIGS. 3 and 8 wherein a cylindrical bore 550HD of FIGS. 3 and 8 passes through the center of said pinion gear and through the center of the tool receiving receptacle 554D.

To retract and restrain the threaded end 452H of FIGS. 3 and 8 so that it does not protrude beyond the outside edge 272 of FIG. 8 of housing 270, said threaded end is manually pushed rearward into the Structural Fastener until collar 440H contacts the rear stop provided by rear gear drive unit 320; said threaded end is rotated until bore 405H aligns with the bores 550H and 550DH of FIG. 8; and then restraining pin 401 is inserted through these bores, thus restraining the forward thrust of coupler shaft 410H. The longitudinal position of the bore 405H in the coupling segment 450H varies in accordance with the spatial relationships of a particular Structural Fastener.

Worm-Drive Structural Fastener

Another embodiment of the Structural Fastener of this invention is to use a worm drive instead of pinion gears to drive the coupler shaft. Many other variations and modifications to the drive mechanism will be readily apparent to those skilled in the art and this particular embodiment is not to be construed in the limiting sense. A worm-drive Structural Fastener 6 of FIG. 9 comprises many of the components as hereinbefore described and these components are incorporated by reference to the hereinbefore description.

Figure 10:
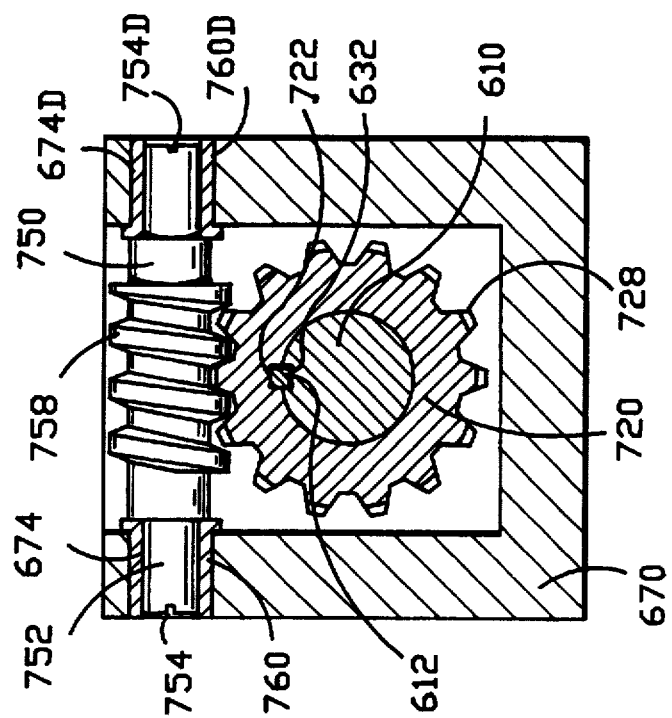
FIG. 10 shows a sectional view taken along line 10—10 of FIG. 9 showing the interaction between the worm drive, the worm gear and the coupler shaft.
Figure 9:
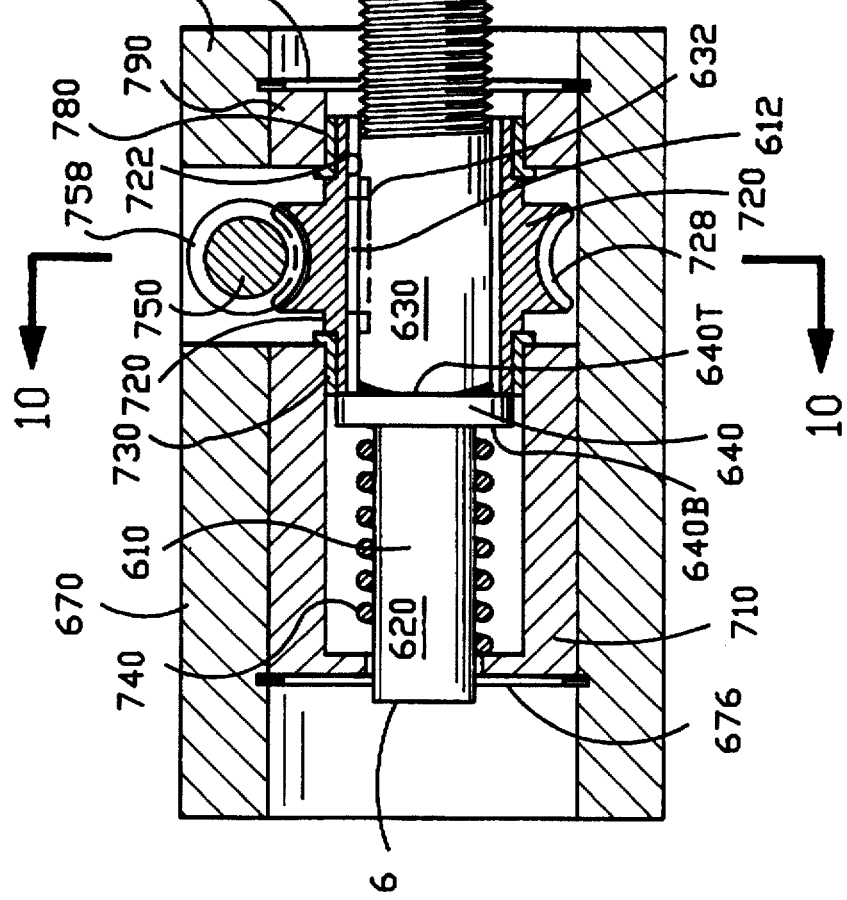
FIG. 9 shows a sectional view of a Structural Fastener modified to be driven by a worm drive.

The assembled worm-drive Structural Fastener 6 of FIG. 9 comprises:

a rear retaining ring 676 compressed and mounted in a grove in the housing enclosure 670;

a rear gear housing 710 of FIG. 9 that functions as a rear stop for the components of the Structural Fastener, a support housing for the coupler shaft 610, rear bushing 730 and the worm gear 720, and provides a rear spring stop for spring 740;

a rear bushing 730 of FIG. 9 that mounts into the top aperture of the rear gear housing 710 and provides a low-friction support for the worm gear 720;

the worm gear 720 of FIGS. 9 and 10 with a keyslot 722, said worm gear interacting with a worm drive 750 so as to rotate and drive a threaded end 652 of a coupler shaft 610;

a helical spring 740 of FIG. 9 that encircles the end segment 620 of the coupler shaft and that provides a compressive force on said coupler shaft that forces the threaded end 652 to extend pass an outside edge 672 of housing 670 so as to be available to be threaded into a mating female threaded socket when said coupler shaft is rotated;

the coupler shaft 610 of FIGS. 9 and 10 provides the threaded end 652 that couples with a mating female threaded socket thus providing a longitudinal coupling that can provide greater load distribution than currently used fasteners and virtually seamless joining;

the worm drive 750 of FIGS. 9 and 10 that is manually rotated by a hand or power-driven tool and transfers its rotational motion via worm 758 into rotation of the worm gear 720 that in turn interacts via keyslot 722 with a key 612 mounted in retainer slot 632 of a keyed segment 630 to rotate coupler shaft 610;

a front bushing 780 of FIG. 9 that mounts into the aperture of a front support 790 and provides a low-friction support for the worm gear 720;

the front support 790 of FIG. 9 that functions as a front stop for the components of the Structural Fastener and as a support housing for the coupler shaft 610 and front bushing 780;

a front retaining ring 678 of FIG. 9 compressed and mounted in a grove in the housing enclosure 670; all enclosed in a housing 670 of FIG. 9.

The housing 670 of FIG. 9, comprises a longitudinal cylindrical polygon with apertures 674 and 674D of FIG. 10 that receive worm gear bushings 760 and 760D, respectively, said bushings providing a low-friction support for a shaft 752 of worm 758 and circular slots cut into the interior of said housing, said slots sized and spaced to receive front and rear retaining rings 678 and 676, respectively.

The assembled components of a worm-drive Structural Fastener mounted in an appropriate housing interact as follows:

the longitudinal axis of the coupler shaft 610 is aligned to the longitudinal axis of a female threaded socket;

the helical spring 740 of FIG. 9, being compressed between the rear gear housing 710 and the collar 640, exerts a compressive force on coupler shaft 610 that forces the threaded end 652 to extend pass the outside edge 672 of housing 670;

the Structural Fastener is positioned such that the outside edge 672 of the housing contacts the entry wall of said female threaded socket; this positioning forces the coupler shaft 610 rearward into the fastener and further compresses the spring 740;

worm 758 of FIGS. 9 and 10 is rotated by a tool inserted into the tool receiving receptacle 754 or 754D of FIG. 10;

the rotational motion of said worm is translated into rotation of worm gear 720; the rotation of worm gear 720 is translated via keyslot 722, key 612 and keyslot 632 into rotation of coupler shaft 610 and thus rotation of the threaded end 652 of FIG. 9;

the rotation of threaded end 652 combined with the forward thrust provided by the compressed spring 740 causes the threaded end 652 to thread itself into the mating female threaded socket;

as the threaded end 652 threadedly enters into said socket, the collar 640 of coupler shaft 610 advances until said collar contacts the bottom end of the worm gear 720;

continued rotation of said worm causes the threaded end 652 to thread deeper into said socket, thus advancing collar 640, said collar transmitting a force via the worm gear 720 that moves the Structural Fastener or its housing into contact with said entry wall;

further rotational torque applied to worm 758 increases the torque applied to the threaded end (stud) and socket connection but will not result in any further rotation of the coupler shaft 610; the Structural Fastener is now connected to the socket.

Non-destructive decoupling is similar to the above. Rotation of the worm drive 750 of FIGS. 9 and 10 in a direction opposite that of the rotation used to threadedly connect the coupler shaft 610 to the socket causes:

the worm gear 720 of FIG. 10 to rotate the coupler shaft 610 in a direction opposite to the coupling rotational direction;

this opposite rotation is conveyed via keyslot 722, key 612 and keyslot 632 to the coupler shaft 610;

coupler shaft 610 then rotates in a direction opposite to the coupling rotational direction; this opposite rotation causes the threaded end 652 to unthread out of the socket;

when threaded end 652 withdraws from the threaded portion of said socket, coupler shaft 610 is uncoupled;

A disconnected coupler shaft 610 continues to maintain the threaded end in an extended position due to the force applied along the longitudinal axis of the coupler shaft by spring 740.

Structural Fastener Housing Configurations

Figure 11:
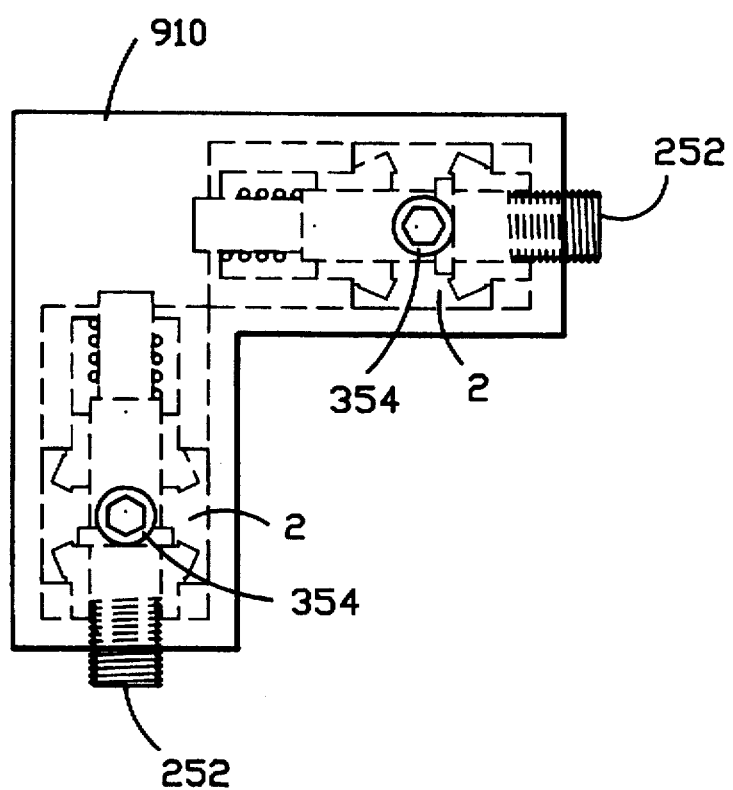
FIG. 11 shows a top sectional view of a right-angle housing for two assembled Structural Fasteners.
Figure 12:
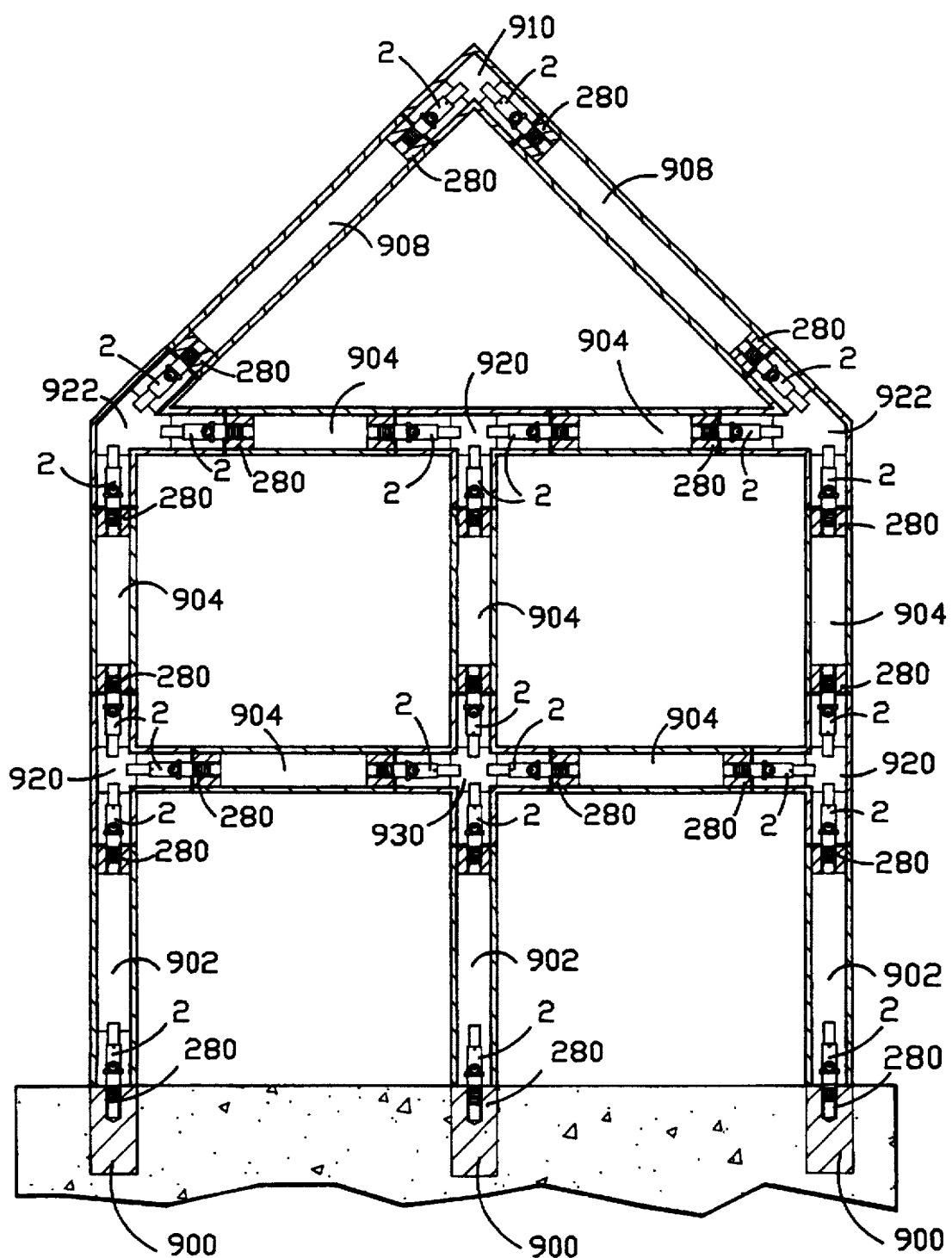
FIG. 12 shows a schematic view of various Structural Fastener housings used in a structural frame.

The Structural Fastener is designed to be housed in various ready-to-use configurations so that structural framing members, beams, panels, prefabricated structures and ready-to-assembly components such as equipment, tools, furniture, scaffolding and fencing, can be quickly and seamlessly joined or non-destructively disconnected (uncoupled). Several configurations for housing Structural Fasteners are illustrated in FIGS. 11 and 12. Many other variations and modifications will be readily apparent to those skilled in the art and these particular embodiments are not to be construed in the limiting sense.

Assembled Structural Fasteners 2 of FIG. 11 are shown mounted in a right-angle housing 910 such as used for corner fastening of a framework, a roof apex 910 of FIG. 12, or wherever right-angle joining is desired. The tool receiving receptacle 352 is accessible through an aperture located on an exposed face of the housing, thus provide quick and easy access. FIG. 12 shows several 2-dimensional aspects of Structural Fastener housings that can be used to quickly assemble (or disassemble) the frame for a structure such as a house, pool enclosure, Florida room, or the like. The extension of this framework into 3-dimensional space is readily accomplished by incorporating mating female sockets and/or Structural Fasteners at the desired angle to the housings described.

Beam 902 of FIG. 12 comprises a Structural Fastener 2 mounted in the bottom end of said beam, a length of structural material and a female threaded socket 280 mounted in the top end of said beam. Beams 902 are coupled to female threaded sockets 280 set into concrete footings to form a first level of vertical supports for the structural frame.

A T-housing 920 of FIG. 12, comprised of three Structural Fasteners 2 mounted in a tee-shaped housing, is connected to socket 280 mounted in the top end of the leftmost beam 902 and a second T-housing 920 is connected to socket 280 mounted in the top end of the rightmost beam 902. A X-housing 930 of FIG. 12, comprised of four Structural Fasteners 2 mounted in a perpendicular cross-shaped housing, is connected to socket 280 mounted in the top end of the center beam 902.

A dual-socketed beam 904 with female threaded sockets 280 mounted in opposing ends is connected between the leftmost T-housing 920 and the center X-housing 930 to form a leftmost horizontal support. A second dual-socketed beam 904 is connected between the rightmost T-housing 920 and the center X-housing 930 to form a rightmost horizontal support. A second level of vertical supports is incorporated into this structural frame by connecting dual-socketed beams 904 to the leftmost and rightmost T-housings and to the center X-housing.

An oblique T-housing 922 of FIG. 12 comprised of two Structural Fasteners perpendicular to each other and a third Structural Fastener at an acute angle is used to connect the vertical support to the roof member. A leftmost oblique T-housing 922 connects to the leftmost vertical dual-socketed beam 904 and a rightmost oblique T-housing 922 connects to the rightmost vertical dual-socketed beam 904. A T-housing connects to the center dual-socketed beam 904. A leftmost dual-socketed beam 904 is connected between the leftmost oblique T-housing 922 and the center T-housing 920 to form a leftmost horizontal support. A second dual-socketed beam 904 is connected between the rightmost oblique T-housing 922 and the center T-housing 920 to form a rightmost horizontal support.

A large-span, dual-socket beam 908 of FIG. 12 with female threaded sockets 280 mounted in opposing ends is connected to the leftmost oblique T-housing 922 and to a right-angle housing 910 that functions as the apex of the structure. A second large-span, dual-socket beam 908 is connected to the rightmost oblique T-housing 922 and to the apex right-angle housing 910.

While only a few embodiments have been illustrated and described, many variations may be made in the design and configuration without departing from the scope of the invention as set forth in the appended claims.

What I claim is:

1. A mechanical fastener for longitudinal coupling to a threaded socket, said fastener comprising:

a rear support means for supporting a coupling means and a driving means, and for providing a spring stop;

said driving means for rotating said coupling means;

said coupling means for rotating a threaded stud into said socket;

a spring means to provide a compressive force on said coupling means so as to cause said threaded stud to extend; and a front support means for supporting said coupling means;

wherein said rear support means, said driving means, said coupling means, said spring means, and said front support means are all mounted in a support housing.

2. A mechanical fastener as claimed in claim 1 wherein said driving means comprise a tool-driven pinion gear and a ring gear drive unit wherein:

said tool-driven pinion gear is rotated by a tool means;

said rotation is transferred to said ring gear drive unit by direct gear engagement; and rotation of said ring gear drive unit is transferred via key and keyslot means to said coupling means that rotates a threaded end of said coupling means.

3. A mechanical fastener as claimed in claim 1:

wherein said rear support means comprise a ring gear housing that provides a rear support housing for a coupler shaft and a ring gear drive unit; and provides said spring stop upon which a springs sits:

wherein said ring gear drive unit interacts with a pinion gear and said coupler shaft so as to rotate a threaded end of said coupler shaft;

wherein said spring provides a compressive force on said coupler shaft;

wherein said threaded end of said coupler shaft is adapted to couple with said threaded socket;

wherein said pinion gear, when rotated, transfers its rotational motion into rotation of said ring gear drive unit; and wherein said front support means provides a front support housing for said coupler shaft.

4. A mechanical fastener as claimed in claim 3 further comprising;

a restraining means to hold said coupler shaft in a retracted position, a bore extending through said coupler shaft and a bore extending through said pinion gear;

wherein said coupler shaft bore and said pinion gear bore accept said restraining means.

5. A mechanical fastener as claimed in claim 1 further comprising:

a bore extending through said coupling means;

a bore extending through said driving means;

a restraining means insertable through said couplings means bore and said driving means bore so as to hold said coupling means in a retracted position.

6. A mechanical fastener for longitudinal coupling to a threaded socket, said fastener comprising:

a rear support means for supporting a coupling means and a driving means, and for providing a spring stop;

said driving means for rotating said coupling means;

said couplings means for rotating a threaded stud into said socket;

a spring means to provide a compressive force on said coupling means so as to cause said threaded stud to extend; and a front support means for supporting said coupling means;

wherein said rear support means, said driving means, said coupling means, said spring means, and said front support means are all mounted in a support housing;

wherein said coupling means comprise an integrated, multi-segmented, multi-sized coupler shaft further comprising:

an end segment that is supported by said rear support means;

said end segment being encircled by said spring means;

a keyed segment that provides a front stop for said spring means and a retainer slot with a key mounted therein;

said key sized to engage a keyslot in said driving means;

a collar that limits the longitudinal distance traversed by said coupler shaft; and a coupling segment that comprises a longitudinal shaft with an unthreaded segment and a threaded stud.

7. A mechanical fastener as claimed in claim 6 further comprising;

a bore extending through said coupler shaft;

a bore extending through said driving means;

a restraining means insertable through said coupler shaft bore and said driving means bore so as to hold said coupler shaft in a retracted position.

8. A mechanical fastener for longitudinal coupling to a threaded socket, said fastener comprising:

a rear support means for supporting a coupling means and a driving means, and for providing a spring stop;

said driving means for rotating said coupling means;

said coupling means for rotating a threaded stud into said socket;

a spring means to provide a compressive force on said coupling means so as to cause said threaded stud to extend; and a front support means for supporting said coupling means;

wherein said rear support means, said driving means, said coupling means, said spring means, and said front support means are all mounted in a support housing;

wherein said spring means comprise a helical spring that provides a compressive force to push said coupling means into an extended position;

said spring encircling an end segment of said coupling means;

one end of said spring resting on said rear support means; and an opposite end of said spring in contact with a keyed segment of said coupling means.

9. A method for assembling a mechanical fastener comprising a ring gear housing, a ring gear drive unit, a spring, a coupler shaft, a pinion gear; and a front support into a longitudinal housing; said method comprising:

mounting said pinion gear into an aperture in said longitudinal housing;

combining said ring gear drive unit and said ring gear housing by placing said ring gear drive unit into said ring gear housing;

inserting said combined ring gear housing and ring gear drive unit into said longitudinal housing until a gear teeth section of said ring gear drive unit meshes with a gear teeth section of said pinion gear;

securing said ring gear housing in said longitudinal housing by attachment means;

placing said spring on an end segment of said coupler shaft;

inserting said spring and said end segment of said coupler shaft into said ring gear drive unit;

continuing to insert said coupler shaft into said ring gear drive unit and rotating said coupler shaft until a key mounted on said coupler shaft aligns with a keyslot in said ring gear drive unit;

continuing to insert said coupler shaft into said ring gear drive unit until said end segment passes through said ring gear housing and a return force (bounce) is applied to said coupler shaft by the compression of said spring;

sliding said front support onto a coupling segment of said coupler shaft until said front support contacts a collar of said coupler shaft;

applying pressure to said front support along a longitudinal axis of said coupler shaft so as to continue to slide said front support into said longitudinal housing until said front support is proximately distanced from said gear teeth section of said pinion gear; and securing said front support to said longitudinal housing by attachment means.

10. A mechanical fastener for longitudinal coupling to a threaded socket, said fastener comprising:

a ring gear housing for providing a spring stop, for supporting a ring gear bushing that mounts into a top aperture of said ring gear housing, and for supporting a ring gear drive unit and a coupler shaft;

said ring gear drive unit interacting with a first pinion gear and a second pinion gear and with said coupler shaft so as to rotate a threaded end of said coupler shaft into said threaded socket;

a spring to provide a compressive force on said coupler shaft so as to cause said threaded end to extent;

an idler gear that acts as a front stop for a collar of said coupler shaft and provides a support for said first and second pinion gears;

an idler gear bushing that mounts into an aperture of a front support and provides a support for said idler gear; and said front support for supporting said idler gear, said idler gear bushing and said coupler shaft.

11. A mechanical fastener as claimed in claim 10 further comprising:

a restraining means to hold said coupler shaft in a retracted position;

a bore extending through said coupler shaft and;

a bore extending through said first and second pinion gears;

wherein said coupler shaft bore, said first pinion gear bore, and said second pinion gear bore accept said restraining means.

12. A mechanical fastener for longitudinal coupling to a threaded socket, said fastener comprising:

a ring gear housing that provides a support housing for a coupler shaft, a ring gear bushing and a ring gear drive unit; and provides a spring stop upon which a spring sits;

wherein said ring gear bushing provides a low-friction support for said ring gear drive unit;

wherein said ring gear drive unit interacts with a first pinion gear and a second pinion gear and said coupler shaft so as to rotate a threaded end of said coupler shaft;

wherein said spring provides a compressive force on said coupler shaft;

wherein said threaded end of said coupler shaft is adapted to couple with said threaded socket;

wherein said first pinion gear, when rotated, transfers its rotational motion into rotation of said ring gear drive unit;

wherein said second pinion gear, when rotated, transfers its rotational motion into rotation of said ring gear drive unit;

wherein a first pinion gear bushing gears second pinion gear bushing provide a low-friction support for said first and second pinion gears, respectively;

wherein an idler gear provides a front stop for a collar on said coupler shaft and provides a support for said first and second pinion gears;

wherein said idler gear bushing mounts into a front support and provides a low-friction support for said idler gear; and wherein said front support provides a support housing for said coupler shaft, said idler gear bushing and said idler gear.

13. A method for assembling a mechanical fastener comprising a ring gear housing, a ring gear bushing, a ring gear drive unit, a spring, a coupler shaft, a first and a second pinion gear, a first and a second pinion gear bushing, an idler gear, an idler gear bushing and a front support, into a longitudinal housing; said method comprising:

fixedly mounting said first pinion gear bushing into a first aperture in said longitudinal housing;

fixedly mounting said second pinion gear bushing into a second aperture in said longitudinal housing;

mounting said first pinion gear into said first pinion gear bushing;

mounting said second pinion gear into said second pinion gear bushing;

assembling said ring gear drive unit, said ring gear bushing and said ring gear housing into a rear combined unit by placing said ring gear bushing into said ring gear housing, and then placing said ring gear drive unit into said ring gear bushing;

inserting said rear combined unit into said longitudinal housing until a gear teeth section of said ring gear drive unit meshes with a gear teeth section of said first pinion gear and a gear teeth section of said second pinion gear;

securing said rear combined unit in said longitudinal housing by attachment means;

placing said spring on an end segment of said coupler shaft;

inserting said spring and said end segment of said coupler shaft into said ring gear drive unit;

continuing to insert said coupler shaft into said ring gear drive unit and rotating said coupler shaft until a plurality of keys mounted on said coupler shaft align with a plurality of keyslots in said ring gear drive unit;

continuing to insert said coupler shaft into said ring gear drive unit until said end segment passes through said ring gear housing and a return force (bounce) is applied to said coupler shaft by the compression of said spring;

assembling said idler gear, said idler gear bushing and said front support into a front support unit by placing said idler gear bushing into said front support and then placing said idler gear into said idler gear bushing;

sliding said front support unit onto a coupling segment of said coupler shaft, while applying pressure to said front support unit along a longitudinal axis of said coupler shaft, until a gear teeth section of said idler gear meshes with said gear teeth section of said first pinion gear and said gear teeth section of said second pinion gear; and securing said front support unit to said longitudinal housing by attachment means.

14. A mechanical fastener for longitudinal coupling to a threaded socket, said fastener comprising:

a rear support means for supporting a coupling means, for supporting a worm driving means and for providing a spring stop;

said worm driving means for rotating said coupling means;

said coupling means for rotating a threaded stud into said threaded socket;

a spring means to provide a compressive force on said coupling means so as to push said threaded stud into an extended position; and a front support means for supporting said coupling means and for supporting said worm driving means;

wherein said rear support means, said worm driving means, said coupling means, said spring means, and said front support means are all mounted in a support housing.

15. A mechanical fastener as claimed in claim 14 wherein said worm driving means comprise:

a worm drive with a tool receiving receptacle:

said worm drive interacts with a worm gear;

said worm gear being keyed to said coupling means;

rotation of said worm drive by a tool inserted into said tool receiving receptacle causing a corresponding rotation in said worm gear and in said coupling means.

16. A mechanical fastener for longitudinal coupling to a threaded socket, said fastener comprising:

a rear support means for supporting a coupling means, for supporting a worm driving means and for providing a spring stop;

said worm driving means for rotating said coupling means;

said coupling means for rotating a threaded stud into said threaded socket;

a spring means to provide a compressive force on said coupling means so as to push said threaded stud into an extended position; and a front support means for supporting said coupling means and for supporting said worm driving means;

wherein said rear support means, said worm driving means, said coupling means, said spring means, and said front support means are all mounted in a support housing;

wherein said rear support means comprise a rear gear housing that supports a coupler shaft and a worm gear; and provides a spring stop for said spring means;

wherein said worm driving means comprise a tool-driven shaft with a worm that interacts with a worm gear, said worm gear being keyed to said coupling means;

wherein said coupling means comprise a coupler shaft that is keyed to said worm gear and is rotated by said worm gear;

wherein said spring means comprise a helical spring that provides a compressive force to push said coupler shaft into an extended position, said spring encircling an end segment of said coupling shaft and extending from said rear gear housing to a collar on said coupler shaft that limits the longitudinal distance traversed by said coupler shaft; and wherein said front support means comprise a front support housing that supports said coupler shaft and said worm gear.

17. A mechanical fastener for longitudinal coupling to a threaded socket, said fastener comprising:

a rear support means comprising a ring sear housing that provides a support housing for a coupler shaft and a ring gear drive unit; and provides a spring stop upon which a spring sits:

wherein said ring gear drive unit interacts with a pinion gear and said coupler shaft so as to rotate a threaded end of said coupler shaft;

wherein said spring provides a compressive force on said coupler shaft;

wherein said threaded end of said coupler shaft is adapted to couple with said threaded socket;

wherein said pinion gear, when rotated, transfers its rotational motion into rotation of said ring gear drive unit; and wherein a front support means provides a support housing for said coupler shaft;

wherein rotation of said coupler shaft in a direction opposite that of the rotation used to threadedly connect said threaded end into said threaded socket non-destructively withdraws said threaded end from said threaded socket.

18. A mechanical fastener for longitudinal coupling to a threaded socket, said fastener comprising:

a ring gear housing that provides a support housing for a coupler shaft, a ring gear bushing and a ring gear drive unit; and provides a spring stop upon which a spring sits;

wherein said ring gear bushing provides a low-friction support for said ring gear drive unit;

wherein said ring gear drive unit interacts with a first pinion gear and a second pinion gear and said coupler shaft so as to rotate a threaded end of said coupler shaft;

wherein said spring provides a compressive force on said coupler shaft;

wherein said threaded end of said coupler shaft is adapted to couple with said threaded socket;

wherein said first pinion gear, when rotated, transfers its rotational motion into rotation of said ring gear drive unit;

wherein said second pinion gear, when rotated, transfers its rotational motion into rotation of said ring gear drive unit;

wherein a first pinion gear bushing and a second pinion gear bushing provides a low-friction support for said first and second pinion gears, respectively;

wherein an idler gear provides a front stop for a collar on said coupler shaft and provides a support for said first and second pinion gears;

wherein an idler gear bushing mounts into a front support and provides a low-friction support for said idler gear;

wherein said front support provides a support housing for said coupler shaft, said idler gear bushing and said idler gear; and wherein rotation of said coupler shaft in a direction opposite that of the rotation used to threadedly connect said threaded end into said threaded socket non-destructively withdraws said threaded end from said threaded socket.

* * * * *